US010661456B2

(12) United States Patent
Nagamatsu et al.

(10) Patent No.: US 10,661,456 B2
(45) Date of Patent: May 26, 2020

(54) FORCE DETECTION APPARATUS AND ROBOT

(71) Applicant: Seiko Epson Corporation, Tokyo (JP)

(72) Inventors: Shoichi Nagamatsu, Shiojiri (JP); Tatsushi Kato, Chino (JP); Hiroki Kawai, Matsumoto (JP)

(73) Assignee: Seiko Epson Corporation (JP)

( * ) Notice: Subject to any disclaimer, the term of this patent is extended or adjusted under 35 U.S.C. 154(b) by 147 days.

(21) Appl. No.: 16/023,022

(22) Filed: Jun. 29, 2018

(65) Prior Publication Data

US 2019/0001510 A1    Jan. 3, 2019

(30) Foreign Application Priority Data

Jun. 30, 2017  (JP) ................................. 2017-128483

(51) Int. Cl.
| | |
|---|---|
| B25J 19/02 | (2006.01) |
| G01L 5/00 | (2006.01) |
| G01L 1/16 | (2006.01) |
| B25J 13/08 | (2006.01) |
| G01L 5/167 | (2020.01) |

(52) U.S. Cl.
CPC ........... *B25J 19/028* (2013.01); *B25J 13/085* (2013.01); *G01L 1/16* (2013.01); *G01L 5/0061* (2013.01); *G01L 5/009* (2013.01); *G01L 5/167* (2013.01)

(58) Field of Classification Search
CPC ....... G01L 5/0061; G01L 5/167; G01L 5/009; G01L 1/16; B25J 19/028; B25J 13/085
See application file for complete search history.

(56) References Cited

U.S. PATENT DOCUMENTS

| | | | | |
|---|---|---|---|---|
| 3,358,257 A | * | 12/1967 | Brewer ..................... | G01L 1/16 338/5 |
| 3,566,163 A | * | 2/1971 | Fischer ..................... | G01L 1/16 310/329 |
| 4,680,606 A | * | 7/1987 | Knutti ....................... | G01L 1/18 257/419 |
| 4,745,812 A | * | 5/1988 | Amazeen .................. | G01L 1/18 338/47 |
| 4,802,371 A | * | 2/1989 | Calderara ................. | G01L 1/16 310/338 |
| 5,789,890 A | * | 8/1998 | Genov .................. | B25J 9/1615 318/567 |
| 5,821,432 A | * | 10/1998 | Sidler ..................... | G01L 5/167 73/862.043 |

(Continued)

FOREIGN PATENT DOCUMENTS

JP     2012-220462 A    11/2012

*Primary Examiner* — Jonathan M Dunlap
(74) *Attorney, Agent, or Firm* — Harness, Dickey & Pierce, P.L.C.

(57) ABSTRACT

A force detection apparatus includes a first member, a second member placed to be opposed to the first member, a sensor device placed between the first member and the second member and including a force detection element having at a piezoelectric element that outputs a signal according to an external force, and a pressurization bolt provided in an outer periphery of the sensor device in a plan view as seen from a direction in which the first member and the second member overlap and pressurizing the sensor device, wherein the first member has a groove which is between the sensor device and the pressurization bolt in the plan view.

16 Claims, 12 Drawing Sheets

(56) References Cited

U.S. PATENT DOCUMENTS

| | | | | |
|---|---|---|---|---|
| 5,965,808 A * | 10/1999 | Normann | ............ | B60C 23/0408 116/34 R |
| 6,612,143 B1 * | 9/2003 | Butscher | ................ | A61C 7/04 72/21.4 |
| 7,603,906 B2 * | 10/2009 | Kroger | .................... | G01L 9/008 73/714 |
| 8,869,632 B2 * | 10/2014 | Tsuchiya | ................ | B25J 13/085 73/862.59 |
| 9,046,432 B2 * | 6/2015 | Oka | ........................ | B25J 9/1633 |
| 9,091,607 B2 * | 7/2015 | Matsumoto | ............ | B25J 19/028 |
| 9,127,996 B2 * | 9/2015 | Kawai | .................... | B25J 13/085 |
| 9,217,680 B2 * | 12/2015 | Kamiya | ........................ | B25J 9/00 |
| 9,381,647 B2 * | 7/2016 | Kamiya | ................ | B25J 13/085 |
| 9,410,856 B2 * | 8/2016 | Kamiya | .................... | G01L 1/16 |
| 9,481,089 B2 * | 11/2016 | Matsuzawa | ............ | B25J 9/1694 |
| 2007/0277618 A1 * | 12/2007 | Kroeger | ................. | G01L 9/008 73/723 |
| 2008/0296523 A1 * | 12/2008 | Gianchandani | ....... | F16K 31/007 251/129.06 |
| 2012/0048027 A1 * | 3/2012 | Hashiguchi | ............ | B25J 9/0087 73/763 |
| 2012/0260745 A1 | 10/2012 | Tsuchiya et al. | | |
| 2013/0112010 A1 * | 5/2013 | Matsumoto | ............ | B25J 19/028 73/862.044 |
| 2013/0152700 A1 * | 6/2013 | Kamiya | ..................... | B25J 9/00 73/862.043 |
| 2013/0152701 A1 * | 6/2013 | Oka | ........................ | B25J 9/1633 73/862.044 |
| 2013/0233089 A1 * | 9/2013 | Kawai | .................... | B25J 13/085 73/862.68 |
| 2014/0053660 A1 * | 2/2014 | Kamiya | .................... | G01L 1/16 73/862.68 |
| 2014/0236354 A1 * | 8/2014 | Kamiya | ................. | B25J 13/085 700/258 |
| 2014/0366646 A1 * | 12/2014 | Matsuzawa | ............... | G01L 1/16 73/862.68 |
| 2015/0120051 A1 * | 4/2015 | Matsuzawa | ......... | H01L 41/1132 700/258 |
| 2015/0127159 A1 * | 5/2015 | Kamiya | ................. | G01P 15/18 700/258 |
| 2015/0239126 A1 * | 8/2015 | Matsuzawa | ............ | B25J 13/085 700/258 |
| 2016/0109311 A1 * | 4/2016 | Inazumi | .................. | G01L 5/167 73/862.042 |
| 2016/0313195 A1 * | 10/2016 | Kamiya | .................... | G01L 1/16 |
| 2017/0021504 A1 * | 1/2017 | Matsuzawa | ............ | B25J 9/1694 |
| 2018/0283966 A1 * | 10/2018 | Matsuzawa | ............ | B25J 13/085 |

\* cited by examiner

FORCE DETECTION APPARATUS AND ROBOT

BACKGROUND

1. Technical Field

The present invention relates to a force detection apparatus and robot.

2. Related Art

In related art, in industrial robots having robot arms with end effectors attached thereto, force detection apparatuses that detect forces applied to the end effectors are used. As an example of the force detection apparatuses, e.g. an apparatus having a plurality of piezoelectric materials and using piezoelectric effects of the piezoelectric materials is known.

For example, Patent Document 1 (JP-A-2012-220462) discloses a force detection apparatus having a sensor device including a sensor element having a plurality of piezoelectric materials and a plurality of electrodes, a first base and a second base in plate shapes that sandwich the sensor device, and a plurality of bolts connecting the first base and the second base. In the force detection apparatus, in a plan view as seen from a direction in which the first base and the second base overlap, the plurality of bolts are placed in the outer peripheral portion of the sensor device. Fastening of these bolts is appropriately adjusted, and thereby, predetermined pressurization is applied to the sensor device.

However, in the force detection apparatus of Patent Document 1, there is a problem that it is difficult to obtain a uniform contact condition of a first member or a second member with the sensor device due to bending of the first member or second member. Accordingly, it is difficult to increase the detection accuracy of the force detection apparatus. Further, there is a problem that the plurality of piezoelectric materials of the sensor device are easy to break due to the nonuniform contact condition of the first member or second member with the sensor device.

SUMMARY

An advantage of some aspects of the invention is to solve at least a part of the problems described above, and the invention can be implemented as the following application examples or embodiments.

A force detection apparatus according to an application example includes a first member, a second member placed to be opposed to the first member, a sensor device placed between the first member and the second member and including a force detection element having at least one piezoelectric element that outputs a signal according to an external force, and a plurality of pressurization members provided in an outer peripheral portion of the sensor device in a plan view as seen from a direction in which the first member and the second member overlap and pressurizing the sensor device, wherein the first member has a first part in contact with the sensor device and a second part located in the outer peripheral portion of the first part in the plan view and including an adjustment part that adjusts contact pressure of the first part on the sensor device, and a length of the adjustment part in pressurization directions by the pressurization members is shorter than a length of the first part in the pressurization directions.

According to the force detection apparatus, the adjustment part is provided, and thereby, the contact pressure (contact condition) of the first part on the sensor device can be made uniform or nearly uniform. Accordingly, higher accuracy of external force detection by the force detection apparatus can be realized. Further, yield strength of the force detection element can be improved.

In the force detection apparatus according to the application example, it is preferable that the adjustment part is provided between the pressurization members and the sensor device in the plan view.

With this configuration, the contact pressure of the first part on the sensor device can be adjusted more preferably.

In the force detection apparatus according to the application example, it is preferable that a concave part is provided in the second part, and the adjustment part includes a bottom portion of the concave part.

With this configuration, the contact pressure of the first part on the sensor device can be adjusted more preferably. Further, the adjustment part can be formed by a relatively simple configuration with the concave part.

In the force detection apparatus according to the application example, it is preferable that the first part has a convex part having a convex shape toward the sensor device without pressurization to the sensor device by the plurality of pressurization members.

With this configuration, the contact pressure of the first part on the sensor device can be made more uniform.

In the force detection apparatus according to the application example, it is preferable that the convex part has a thickness gradually increasing toward a center of the sensor device.

With this configuration, the contact pressure of the first part on the sensor device can be made uniform more easily.

In the force detection apparatus according to the application example, it is preferable that a length of the force detection element in directions orthogonal to the pressurization directions is shorter than a length of the force detection element in the pressurization directions.

With this configuration, the difference in contact pressure between the center portion and the outer peripheral portion of the force detection element can be further reduced, and the contact pressure of the first part on the sensor device can be made more uniform.

In the force detection apparatus according to the application example, it is preferable that the piezoelectric element has a piezoelectric material layer that generates electric charge by a piezoelectric effect and an electrode provided in the piezoelectric material layer and outputting a signal according to the electric charge, and an outer shape of the electrode in the plan view is smaller than an outer shape of the piezoelectric material layer in the plan view.

With this configuration, reduction of accuracy of the external force detection due to the difference in contact pressure between the center portion and the outer peripheral portion of the force detection element can be further reduced.

In the force detection apparatus according to the application example, it is preferable that a center portion pressurization member is provided in a center portion of the sensor device in the plan view.

With this configuration, the contact pressure of the first part on the sensor device can be made more uniform.

In the force detection apparatus according to the application example, it is preferable that an outer shape of the force detection element in the plan view is a circular shape.

With this configuration, stress concentration on the outer peripheral portion can be suppressed. Accordingly, the contact pressure of the first part on the sensor device can be made more uniform.

In the force detection apparatus according to the application example, it is preferable that an outer shape of the force detection element in the plan view has a corner portion and the corner portion is at least one of an obtuse shape and a rounded shape.

With this configuration, stress concentration on the outer peripheral portion can be suppressed. Accordingly, the contact pressure of the first part on the sensor device can be made more uniform.

A robot according to an application example includes a base, an arm connected to the base, and the force detection apparatus of the application example connected to the arm.

According to the robot, the force detection apparatus of the application example is provided, and thereby, more precise work can be executed.

BRIEF DESCRIPTION OF THE DRAWINGS

The invention will be described with reference to the accompanying drawings, wherein like numbers reference like elements.

DESCRIPTION OF EXEMPLARY EMBODIMENTS

As below, embodiments of a force detection apparatus and robot will be explained in detail based on the accompanying drawings. The respective drawings contain parts enlarged or reduced as appropriate and parts omitted so that the parts to be explained can be recognized. Further, in this specification, "connection" includes direct connection and indirect connection via an arbitrary member.

1. Robot

First, an example of a robot of the application example will be explained.

Figure 1:
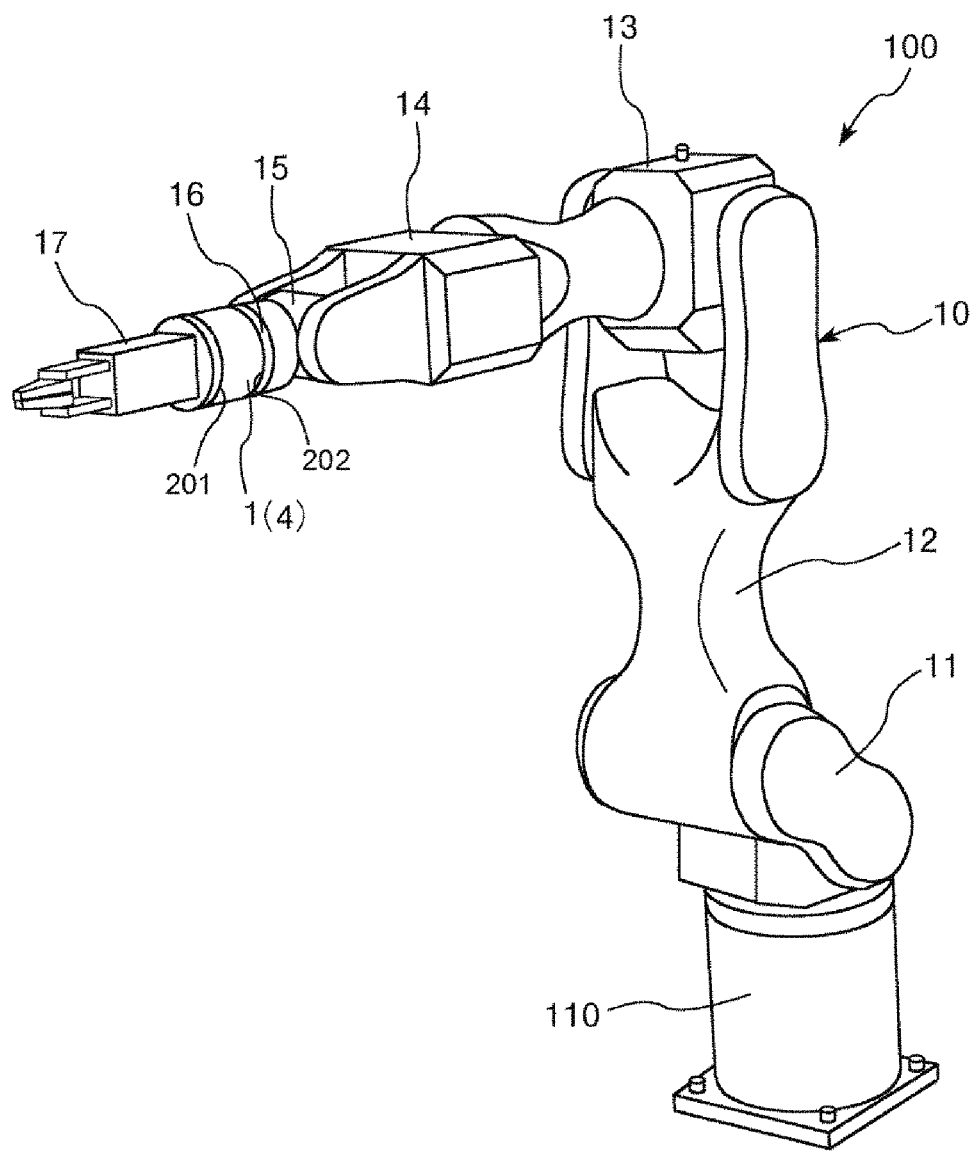
FIG. 1 is a perspective view showing an example of a robot.

FIG. 1 is a perspective view showing a robot of the first embodiment. Note that the side of a base 110 in FIG. 1 is referred to as "proximal end" and the opposite side (the side of an end effector 17) is referred to as "distal end".

A robot 100 shown in FIG. 1 may perform work of feeding, removing, carrying, assembly, etc. of objects including precision apparatuses and components forming the apparatuses. The robot 100 is the so-called single-arm six-axis vertical articulated robot.

The robot 100 has the base 110 and a robot arm 10 rotatably coupled to the base 110. Further, a force detection apparatus 1 is connected to the robot arm 10 and the end effector 17 is connected to the force detection apparatus 1.

The base 110 is a part fixed to e.g. a floor, wall, ceiling, movable platform, or the like. Note that the base 110 itself may be movable as long as the robot arm 10 is connected to the base 110. The robot arm 10 has an arm 11 (first arm), an arm 12 (second arm), an arm 13 (third arm), an arm 14 (fourth arm), an arm 15 (fifth arm), and an arm 16 (sixth arm). These arms 11 to 16 are sequentially coupled from the proximal end side toward the distal end side. The respective arms 11 to 16 are rotatable with respect to the adjacent arms or base 110.

The force detection apparatus 1 is provided between the arm 16 and the end effector 17. The force detection apparatus 1 detects forces (including moment) applied to the end effector 17. The force detection apparatus 1 will be described later in detail.

The arm 16 and the end effector 17 include attachment members (not shown) for attachment of the force detection apparatus 1. The configuration of the attachment members is not particularly limited. For example, a configuration having through holes (female screw holes) used for attachment of the force detection apparatus 1 to the arm 16 or end effector 17 by screwing, bolting, or the like or a configuration having an engagement portion such as a hook or L-shaped groove may be employed. Thereby, the force detection apparatus 1 may be easily attached to an appropriate position. Accordingly, detection accuracy of the external force by the force detection apparatus 1 may be made higher.

The end effector 17 is a tool for performing work on an object as a work object of the robot 100 and includes a hand having a function of grasping the object. Note that the end effector 17 is not limited to the hand, but a tool for the details of work or the like of the robot 100 may be used. The end effector 17 may be e.g. a screwing tool for screwing.

Further, the robot 100 has drive units (not shown) including motors that rotate one arm with respect to the other arm (or base 110). Further, the robot 100 has angle sensors (not shown) that detect rotation angles of the rotation shafts of the motors. The drive units and the angle sensors are provided in e.g. the respective arms 11 to 16.

The robot 100 includes the base 110, the arm 16 (robot arm 10) connected to the base 110, and the force detection apparatus 1 connected to the arm 16. According to the robot 100, the external force applied to the end effector 17 is detected by the force detection apparatus 1, feedback control is performed based on the detection result, and thereby, more precise work may be executed. Further, the robot 100 may sense contact of the end effector 17 with an obstacle or the like based on the detection result by the force detection apparatus 1. Accordingly, an obstacle avoidance action, object damage avoidance action, etc. may be easily performed, and the robot 100 may execute work more safely.

2. Force Detection Apparatus

Next, an example of the force detection apparatus of the application example will be explained.

First Embodiment

Figure 2:
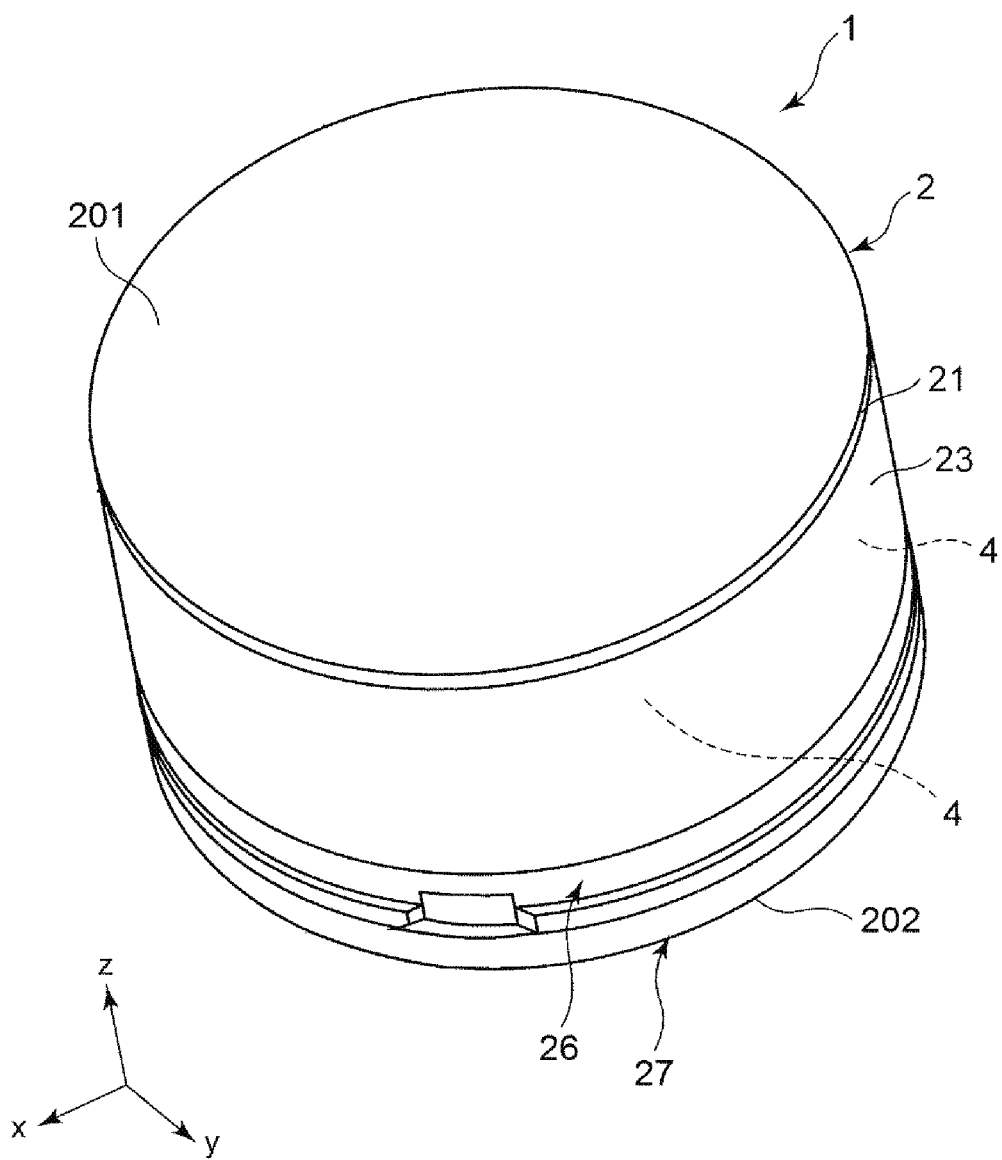
FIG. 2 is a perspective view of a force detection apparatus according to the first embodiment.
Figure 3:
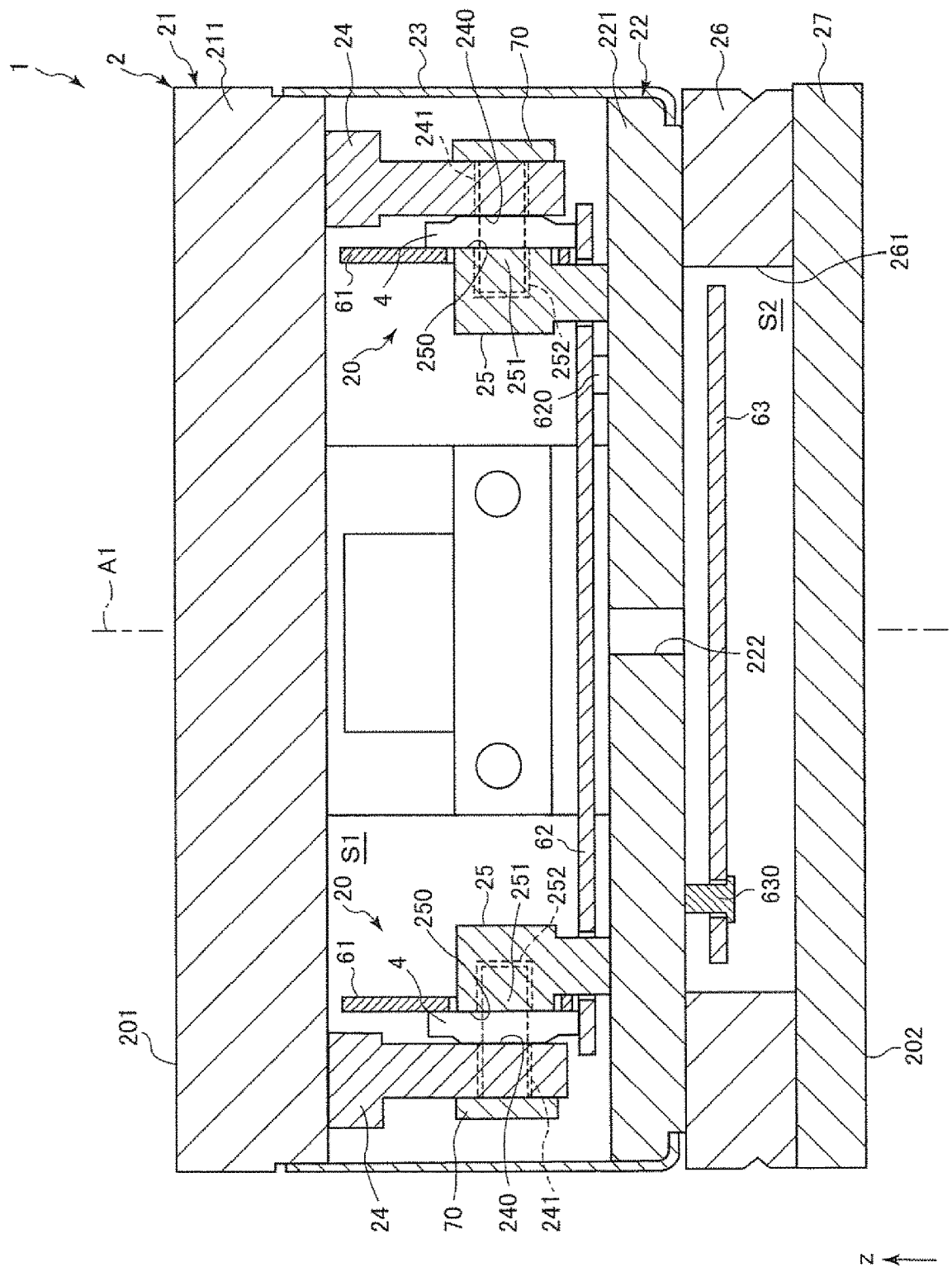
FIG. 3 is a longitudinal sectional view of the force detection apparatus shown in FIG. 2.
Figure 4:
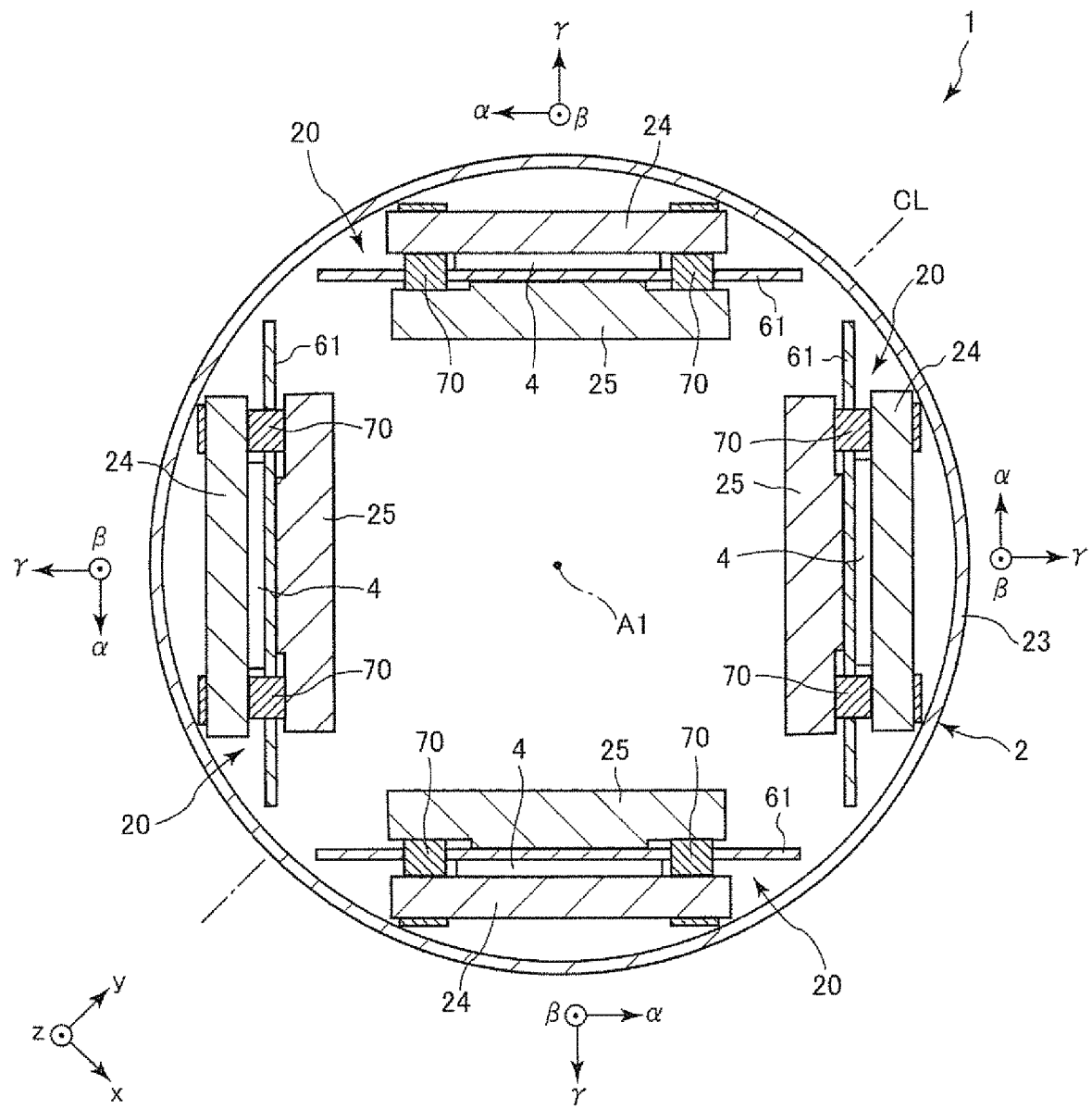
FIG. 4 is a plan view showing inside of the force detection apparatus shown in FIG. 2.
Figure 5:
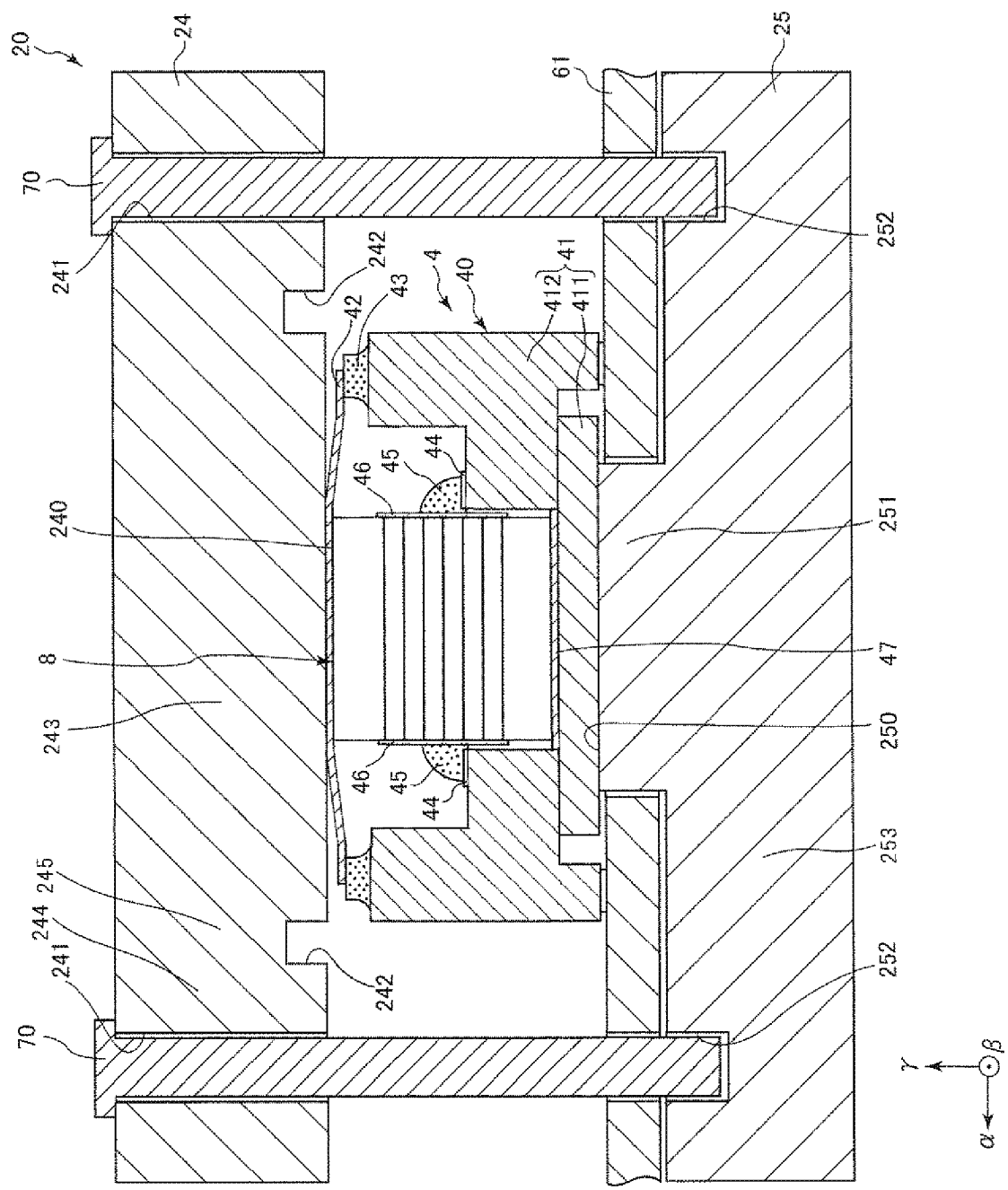
FIG. 5 is a sectional view showing a sensor device of the force detection apparatus shown in FIG. 2.
Figure 6:
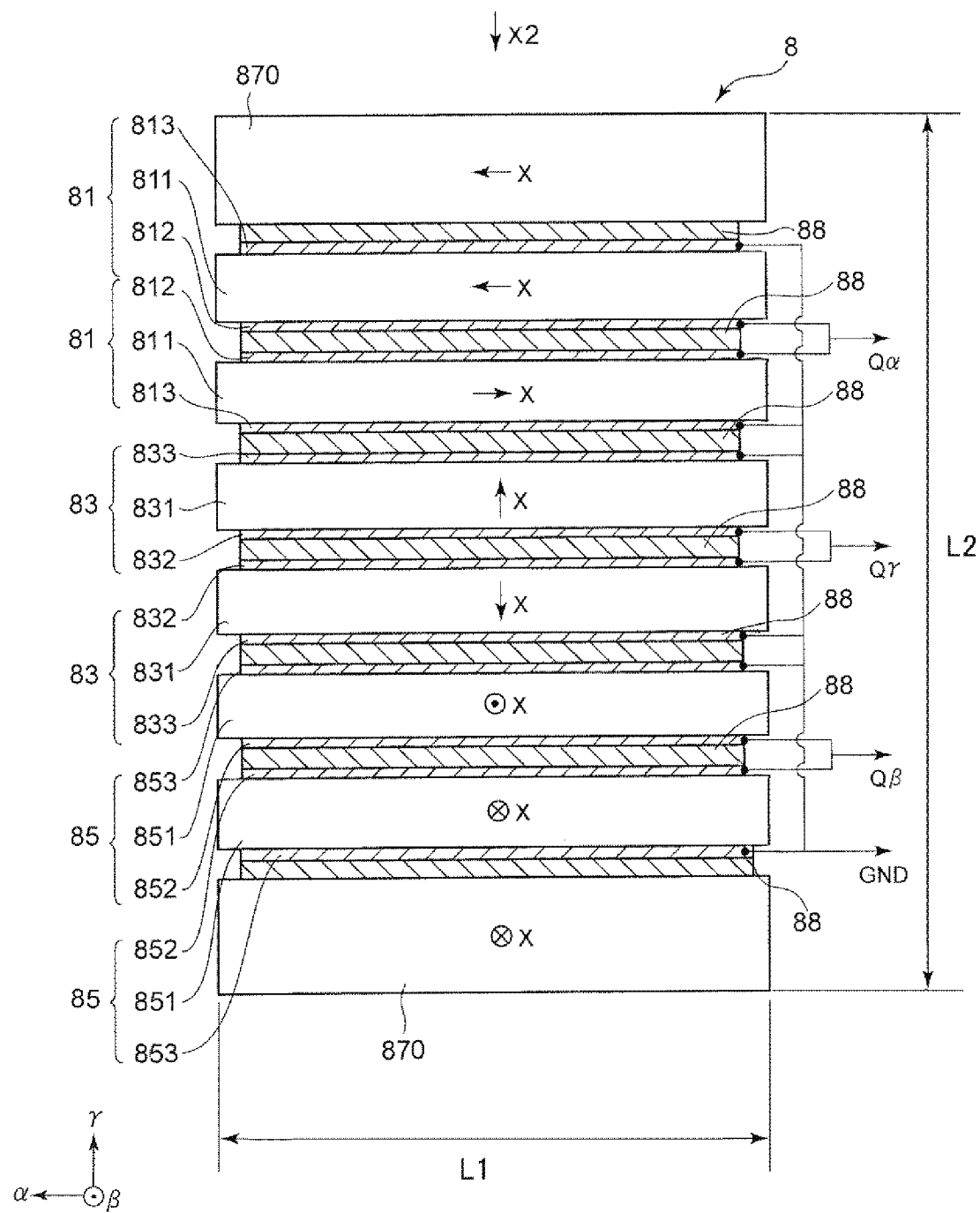
FIG. 6 is a sectional view showing a force detection element of the sensor device shown in FIG. 5.

FIG. 2 is a perspective view of the force detection apparatus according to the first embodiment. FIG. 3 is a longitudinal sectional view of the force detection apparatus shown in FIG. 2. FIG. 4 is a plan view showing inside of the force detection apparatus shown in FIG. 2. FIG. 5 is a sectional view showing a sensor device of the force detection apparatus shown in FIG. 2. FIG. 6 is a sectional view showing a force detection element of the sensor device shown in FIG. 5. Note that, in FIG. 4, a digital circuit board 62 is not shown. Further, in FIGS. 2 to 4, for convenience of explanation, an x-axis, y-axis, and z-axis are shown as three axes orthogonal to one another and the tip end sides of arrows showing the respective axes are "+" and the tail end sides are "−". Furthermore, directions parallel to the x-axis are also referred to as "x-axis directions", directions parallel to the y-axis are also referred to as "y-axis directions", and directions parallel to the z-axis are also referred to as "z-axis directions". Hereinafter, the side in the +z-axis direction is also referred to as "upper" and the side in the −z-axis direction is also referred to as "lower".

The force detection apparatus 1 shown in FIG. 2 is the six-axis force sensor that can detect six axis components of an external force applied to the force detection apparatus 1. Here, the six axis components include translational force (shear force) components in the respective directions of the three axes orthogonal to one another (in the drawings, the x-axis, y-axis, and z-axis) and rotational force (moment) components about the respective three axes.

The force detection apparatus 1 has a case 2, a board housing member 26 connected to the case 2, a connection member 27 connected to the board housing member 26, a plurality of sensor devices 4 housed within the case 2, a plurality of analog circuit boards 61, the single digital circuit board 62, and a relay board 63 housed in the board housing member 26. Note that the outer shape of the force detection apparatus 1 as seen from the z-axis direction is a circular shape as shown in FIG. 2, however, includes, but is not limited to, e.g. a polygonal shape such as a quadrangular shape or pentagonal shape, an elliptical shape, or the like.

In the force detection apparatus 1, the respective sensor devices 4 output signals (detection results) according to the applied external forces and the signals are processed by the analog circuit boards 61 and the digital circuit board 62. Thereby, the six axis components of the external force applied to the force detection apparatus 1 are detected. Further, the signals processed by the digital circuit board 62 are externally output via the relay board 63 electrically connected to the digital circuit board 62.

As below, the respective parts of the force detection apparatus 1 will be explained.

Case

As shown in FIG. 3, the case 2 has a first case member 21, a second case member 22 placed apart from the first case member 21, and a side wall part 23 (third case member) provided in the outer peripheral parts of the first case member 21 and the second case member 22.

First Case Member

The first case member 21 has a first plate 211 in a circular plate shape, and a plurality of (four in the embodiment) first fixing portions 24 (first members) stood in the outer peripheral part of the lower surface of the first plate 211 (see FIGS. 3 and 4). Note that, in the drawings, the first fixing portions 24 and the first plate 211 are separately formed, however, may be integrally formed. Further, the upper surface of the first case member 21 forms an attachment surface 201 to which the end effector 17 is attached (see FIGS. 1 and 3).

As shown in FIG. 3, the respective first fixing portions 24 are connected to the first plate 211 and the sensor devices 4 and have functions of transmitting the external force applied to the force detection apparatus 1 to the sensor devices 4. These plurality of first fixing portions 24 are arranged at equal angular (90°) intervals from each other along the same circumference around a center axis A1 of the force detection apparatus 1 (see FIG. 4). Note that, as shown in FIG. 3, the plurality of first fixing portions 24 have inner wall surfaces 240 located on the center axis A1 side and the inner wall surfaces 240 are in contact on the sensor devices 4. In the respective first fixing portions 24, a plurality of through holes 241 in which pressurization bolts 70, which will be described later, can be inserted are formed.

Second Case Member

The second case member 22 has a second plate 221 in a circular plate shape placed to be opposed to the first plate 211, and a plurality of (four in the embodiment) second fixing portions 25 (second members) stood in the outer peripheral part of the upper surface of the second plate 221 (see FIGS. 3 and 4). Note that, in the drawings, the second fixing portions 25 and the second plate 221 are separately formed, however, may be integrally formed.

As shown in FIG. 3, the respective second fixing portions 25 are connected to the second plate 221 and the sensor devices 4 and have functions of transmitting the external force applied to the force detection apparatus 1 to the sensor devices 4. These plurality of second fixing portions 25 are arranged at equal angular (90°) intervals from each other along the same circumference around the center axis A1 (see FIG. 4). The respective second fixing portions 25 are placed on the center axis A1 side with respect to the above described first fixing portions 24 and face the first fixing portions 24. Further, as shown in FIG. 3, on the first fixing portions 24 sides of the second fixing portions 25, projecting parts 251 projecting toward the first fixing portions 24 sides are provided. Top surfaces 250 of the projecting parts 251 face the inner wall surfaces 240 of the first fixing portions 24 at a distance at which the sensor devices 4 can be inserted. Furthermore, a plurality of female screw holes 252 that can be screwed together with the tip end portions of the pressurization bolts 70 are formed in the respective second fixing portions 25.

Here, the plurality of pressurization bolts 70 (pressurizing members) are inserted into the through holes 241 of the above described first fixing portions 24 and the female screw holes 252 of the second fixing portions 25, and provided around the sensor devices 4. Particularly, in the embodiment, as shown in FIG. 4, two of the pressurization bolts 70 are provided on both sides of the single sensor device 4. Thereby, the sensor device 4 is sandwiched by the first fixing portion 24 and the second fixing portion 25, and thereby, held with pressure. The fastening forces of the pressurization bolts 70 are appropriately adjusted, and thereby, pressure with predetermined magnitude may be applied to the sensor devices 4. The constituent material of the respective pressurization bolts 70 includes, but is not particularly limited to, e.g. various metal materials.

As shown in FIG. 3, in the second plate 221, a through hole 222 penetrating in the thickness direction is provided. Through the through hole 222, a wire (not shown) electrically connecting the digital circuit board 62 and the relay board 63 to be described later etc. are inserted.

Side Wall Part

As shown in FIG. 4, the side wall part 23 (third case member) has a circular cylindrical shape. The upper end portion of the side wall part 23 is fitted with the first plate 211 via a sealing member (not shown) formed by e.g. an O-ring (see FIG. 3). Further, similarly, the lower end portion of the side wall part 23 is fitted with the second plate 221 via a sealing member (not shown). Thereby, the first case member 21, the second case member 22, and the side wall part 23 form an air-tight internal space S1 housing the plurality of sensor devices 4.

Board Housing Member

As shown in FIG. 3, the board housing member 26 is provided between the case 2 and the connection member 27, and the upper surface thereof is connected to the second case member 22 and the lower surface thereof is connected to the connection member 27 to be described later. The board housing member 26 has a circular cylindrical shape with a hole 261 penetrating in the center part. The relay board 63 to be described later is housed within the hole 261. The opening area of the hole 261 is not particularly limited as long as the hole can house the shape of the relay board 63.

Connection Member

The connection member 27 shown in FIG. 2 has a circular plate shape and the upper surface thereof is connected to the board housing member 26. Thereby, as shown in FIG. 3, the opening on the lower surface side of the hole 261 of the above described board housing member 26 is closed and an internal space S2 housing the relay board 63 placed in the hole 261 is formed. Further, the lower surface of the connection member 27 forms an attachment surface 202 to which the arm 16 is attached (see FIGS. 1 and 3).

The respective constituent materials of the above described first case member 21, second case member 22, side wall part 23, board housing member 26, and the connection member 27 include, but are not particularly limited to, e.g. metal materials such as aluminum and stainless steel, ceramics, etc. All of the members may be formed using the same or same kind of material or different materials from one another.

Analog Circuit Board

As shown in FIG. 4, the plurality of (four in the embodiment) analog circuit boards 61 are provided within the case 2. In the embodiment, one analog circuit board 61 is provided for each sensor device 4 and the single sensor device 4 and the corresponding single analog circuit board 61 are electrically connected. The analog circuit board 61 is provided between the first fixing portion 24 and the second fixing portion 25, and inserted through the projecting part 251 and placed on the center axis A1 side with respect to the sensor device 4 (see FIGS. 3 and 4).

Each of the four analog circuit boards 61 includes charge amplifiers (conversion and output circuits, not shown) that respectively convert electric charge Q (Qα, Qβ, Qγ) output from the sensor device 4 to be described later into voltages V (Vα, Vβ, Vγ). The charge amplifier may include e.g. an operation amplifier, a capacitor, and a switching element.

Digital Circuit Board

As shown in FIG. 3, the digital circuit board 62 is provided within the case 2. In the embodiment, the digital circuit board 62 is fixed above the second case member 22 by a fixing member 620 including e.g. a bolt. The digital circuit board 62 is electrically connected to the respective analog circuit boards 61.

The digital circuit board 62 includes an external force detection circuit (not shown) that detects (calculates) an external force based on the voltages V from the analog circuit boards 61. The external force detection circuit calculates translational force components Fx in the x-axis directions, translational force components Fy in the y-axis directions, translational force components Fz in the z-axis directions, rotational force components Mx about the x-axis, rotational force components My about the y-axis, and rotational force components Mz about the z-axis. The external force detection circuit may include e.g. an AD converter and an arithmetic circuit such as a CPU connected to the AD converter.

Relay Board

As shown in FIG. 3, the relay board 63 is placed within the board housing member 26. The relay board 63 is fixed to the second case member 22 by a fixing member 630 including e.g. a bolt. The relay board 63 is electrically connected to the digital circuit board 62 by wiring (not shown) including e.g. a flexible board.

According to the relay board 63, the force detection apparatus 1 may include a pathway of feedback control from a robot controller (not shown) that controls driving of the robot arm 10 of the robot 100 and detection results from the force detection apparatus 1 and an input pathway of correction parameters. Note that the relay board 63 is connected to an external wire (not shown) provided outside of the force detection apparatus 1 and the external wire is connected to the robot controller (not shown).

Sensor Device

As shown in FIG. 4, the four sensor devices 4 are placed to be symmetric with respect to a line segment CL passing through the center axis A1 and parallel to the y-axis as seen from the z-axis direction. The four sensor devices 4 have the same configuration except that the positions within the case 2 are different. The respective sensor devices 4 have functions of detecting external forces (specifically, shear forces and compression or tensile forces) applied along the three axes of an α-axis, β-axis, and γ-axis orthogonal to one another.

As shown in FIG. 5, each sensor device 4 has a force detection element 8 and a package 40 housing the force detection element 8. Note that the sensor device 4 is mounted on the above described analog circuit board 61.

Package

As shown in FIG. 5, the package 40 has a base part 41 having a concave part in which the force detection element 8 is placed and a lid member 42 joined to the base part 41 via a sealing 43 to close the opening of the concave part.

The base part 41 has a bottom member 411 in a plate shape and a side wall member 412 in a rectangular frame shape joined (fixed) to the bottom member 411. The bottom member 411 includes the top surface 250 of the projecting part 251 as seen from the γ-axis direction. Further, the bottom member 411 is connected to the force detection element 8 via an adhesive member 47 formed using e.g. an adhesive agent having an insulation property. The lid member 42 has a plate shape and the edge side thereof bends toward the base part 41 side to cover the force detection element 8. Further, the center part of the lid member 42 is flat in contact with the first fixing portion 24 and the force detection element 8.

As the specific constituent materials of the base part 41 and the lid member 42, e.g. various metal materials including stainless steel and kovar, various ceramics, etc. may be used.

Force Detection Element

The force detection element 8 (stacked structure) shown in FIG. 6 has two piezoelectric elements 81 that output the electric charge Qα according to the external force (shear force) parallel to the α-axis, two piezoelectric elements 83 that output the electric charge Qγ according to the external force (compression/tensile force) parallel to the γ-axis, and two piezoelectric elements 85 that output the electric charge Qβ according to the external force (shear force) parallel to the β-axis, two supporting boards 870, and a plurality of connecting portions 88, and these are stacked as shown in the drawing.

Piezoelectric Element

As shown in FIG. 6, each of the two piezoelectric elements 81 has a ground electrode layer 813 electrically connected to the reference potential (e.g. ground potential GND), a piezoelectric material layer 811, and an output electrode layer 812. Further, the two piezoelectric elements 81 are placed so that the respective output electrode layers 812 may be connected via the connecting portions 88 to each other. Similarly, each of the two piezoelectric elements 83 has a ground electrode layer 833, a piezoelectric material layer 831, and an output electrode layer 832. Further, the two piezoelectric elements 83 are placed so that the respective output electrode layers 832 may be connected via the connecting portions 88 to each other. Similarly, each of the two piezoelectric elements has a ground electrode layer 853, a piezoelectric material layer 851, and an output electrode layer 852. Further, the two piezoelectric elements 85 are placed so that the respective output electrode layers 852 may be connected via the connecting portions 88 to each other.

Figure 8:
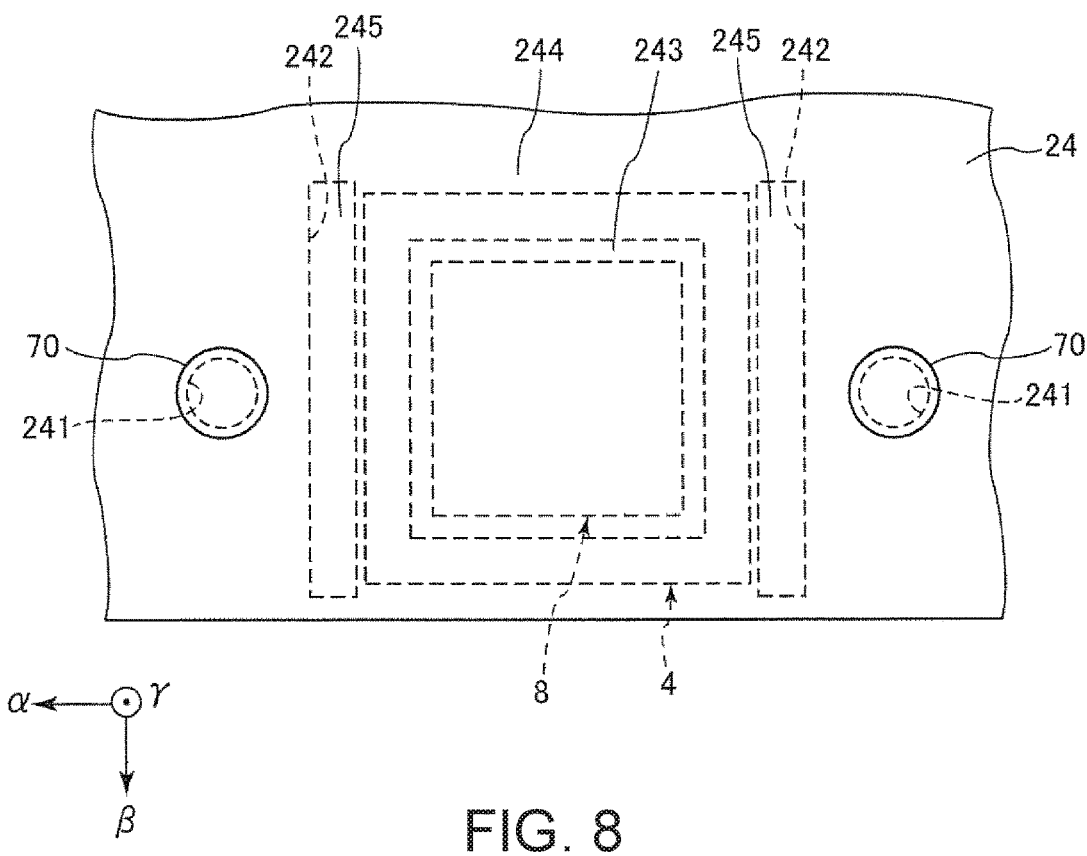
FIG. 8 shows the structure shown in FIG. 7 as seen from a direction of an arrow X1.

The respective piezoelectric material layers 811, 831, 851 are formed using crystal quartz. Thereby, the force detection apparatus 1 having better characteristics such as higher sensitivity, wider dynamic range, and higher rigidity may be realized. Further, as shown in FIG. 8, the piezoelectric material layers 811, 831, 851 are placed so that the directions of the X-axes as crystal axes of the crystal quartz may be different from one another. Specifically, the respective piezoelectric material layers 811 are formed by Y cut quartz crystal plates and placed so that the directions of the X-axes may be different by 180° from each other. Similarly, the respective piezoelectric material layers 851 are formed by Y cut quartz crystal plates and placed so that the directions of the X-axes may be different by 180° from each other. Further, the piezoelectric material layers 811 and the piezoelectric material layers 851 are placed so that the directions of the X-axes may be different by 90° from each other. The respective piezoelectric material layers 831 are formed by X cut quartz crystal plates and placed so that the directions of the X-axes may be different by 180° from each other.

Note that, in the embodiment, the respective piezoelectric material layers 811, 831, 851 are formed using crystal quartz, however, the layers may have configurations using other piezoelectric materials than crystal quartz. The other piezoelectric materials than crystal quartz include e.g. topaz, barium titanate, lead titanate, lead zirconate titanate (PZT: Pb (Zr,Ti)O$_3$), lithium niobate, and lithium tantalate.

The thicknesses of the respective piezoelectric material layers 811, 831, 851 are respectively not particularly limited, but e.g. from 0.1 μm to 3000 μm.

The respective output electrode layers 812, 832, 852 and the respective ground electrode layers 813, 833, 853 are electrically connected to corresponding side electrodes 46 provided on the side surfaces of the force detection element 8. Further, these output electrode layers 812, 832, 852 are electrically connected to the analog circuit board 61 via conducting connecting portions 45 formed using e.g. Ag paste or the like connected to the side electrodes 46, a plurality of internal terminals 44 provided in the package 40, and interconnections (not shown) formed in the base part 41.

The materials forming the respective output electrode layers 812, 832, 852 and the respective ground electrode layers 813, 833, 853 are not particularly limited as long as the materials may function as electrodes, but include e.g. nickel, gold, titanium, aluminum, copper, iron, chromium, or alloys containing the metals. One of them may be used or two or more of them may be combined (stacked, for example) for use.

The thicknesses of the respective output electrode layers 812, 832, 852 and the respective ground electrode layers 813, 833, 853 are respectively not particularly limited, but e.g. from 0.05 μm to 100 μm.

Supporting Board

The respective supporting boards 870 have functions of supporting the piezoelectric elements 81, 83, 85. The thicknesses of these supporting boards 870 are larger than the thicknesses of the respective piezoelectric material layers 811, 831, 851. Thereby, the force detection element 8 may be stably connected to the package 40, which will be described later.

The respective supporting boards 870 are formed using quartz crystal. One supporting board 870 is formed by a quartz crystal plate (Y cut quartz crystal plate) having the same configuration as the piezoelectric material layer 811 of the adjacent piezoelectric element 81, and has the same direction of the X-axis as the piezoelectric material layer 811. Further, the other supporting board 870 is formed by a quartz crystal plate (Y cut quartz crystal plate) having the same configuration as the piezoelectric material layer 851 of the adjacent piezoelectric element 85, and has the same direction of the X-axis as the piezoelectric material layer 851. Here, the quartz crystal has anisotropy, and thus, the coefficients of thermal expansion are different in the X-axis, Y-axis, and Z-axis directions as the crystal axes. Accordingly, it is preferable that the respective supporting boards 870 have the same configurations and placements (the directions of the X-axes) as the adjacent piezoelectric material layers 811, 851 for suppressing forces due to thermal expansion.

Note that the respective supporting boards 870 may be formed using other materials than quartz crystal like the respective piezoelectric material layers 811, 831, 851.

Further, the thicknesses of the respective supporting boards 870 are not particularly limited, but e.g. from 0.1 μm to 5000 μm.

Connecting Portion

The connecting portions 88 are formed using an insulating material and has a function of blocking conduction between the respective piezoelectric elements 81, 83, 85. For the respective connecting portions 88, e.g., silicone, epoxy, acryl, cyanoacrylate, polyurethane adhesive agents may be used.

As above, the force detection element 8 is explained. As described above, when the three axes orthogonal to one another are the α-axis, the β-axis, and the γ-axis, the force detection element 8 has the piezoelectric elements 83 (first piezoelectric elements) including the piezoelectric material layers 831 formed by the X cut quartz crystal plate and outputting the electric charge Qγ according to the external forces along the γ-axis directions. Further, the force detection element 8 has the piezoelectric elements 81 (second piezoelectric elements) including the piezoelectric material layers 811 formed by the Y cut quartz crystal plate and outputting the electric charge Qα according to the external forces in the α-axis directions. Furthermore, the force detection element 8 has the piezoelectric elements 85 (third piezoelectric elements) including the piezoelectric material layers 851 formed by the Y cut quartz crystal plate, placed to sandwich the piezoelectric elements 83 between the piezoelectric elements 81 and themselves, and outputting the electric charge Qβ according to the external forces in the β-axis directions. Thereby, the applied external force may be decomposed and detected using the anisotropy of the piezoelectric effect depending on the crystal orientation of the quartz crystal. That is, the translational force components of the three axes orthogonal to one another may be independently detected.

As described above, the force detection element 8 includes the plurality of (two or more) piezoelectric elements 81, 83, 85, and thereby, the number of detection axes may be made larger. Further, the force detection element 8 may independently detect the translational force components of the three axes orthogonal to one another only if the element has at least one of each of the piezoelectric elements 81, 83, 85 (first to third piezoelectric elements), however, the output sensitivity may be made higher when the element has two of each of the piezoelectric elements 81, 83, 85 (first to third piezoelectric elements) as is the case of the embodiment.

Note that the order of stacking of the respective piezoelectric elements 81, 83, 85 is not limited to that shown in the drawing. Further, the number of piezoelectric elements forming the force detection element 8 is not limited to the above described number. For example, the number of piezoelectric elements may be one to five, seven, or more.

As above, the basic configuration of the force detection apparatus 1 is explained.

Here, the above described first fixing portion 24, second fixing portion 25, pressurization bolts 70, sensor device 4, and analog circuit board 61 form "structure 20" (see FIG. 5). In the structure 20, various efforts are made to make the contact pressure (contact conditions) of the first fixing portion 24 and the second fixing portion 25 on the sensor device 4 uniform or nearly uniform. As below, the efforts will be explained in detail.

Figure 7:
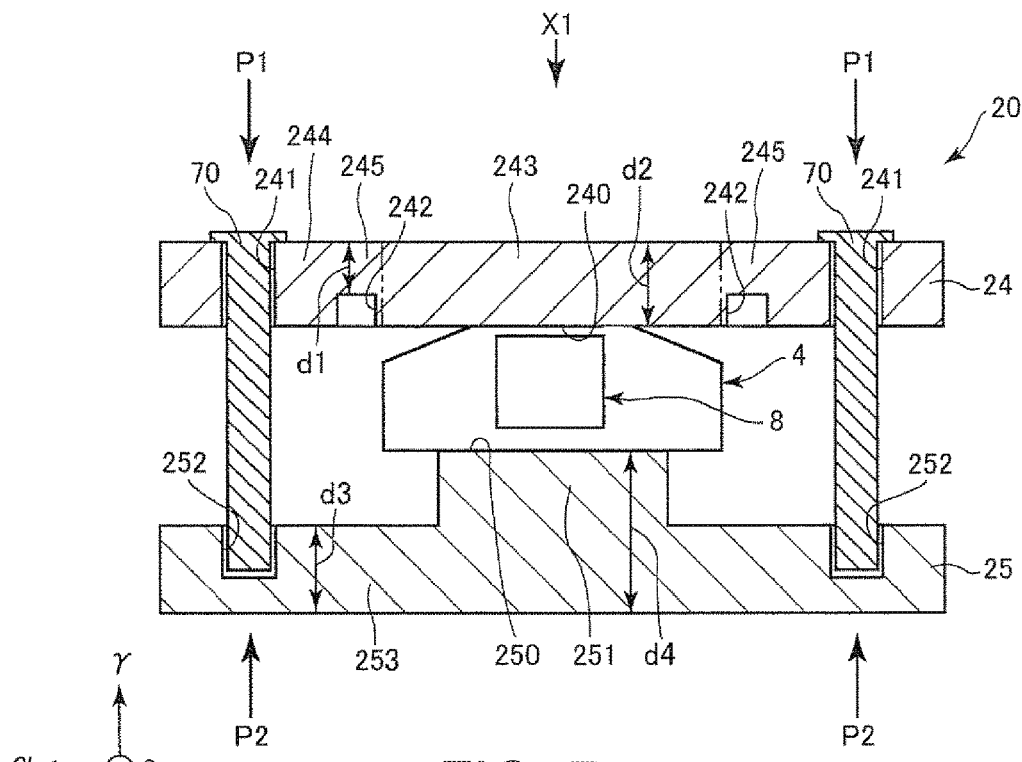
FIG. 7 is a sectional view schematically showing a structure shown in FIG. 5.
Figure 9:
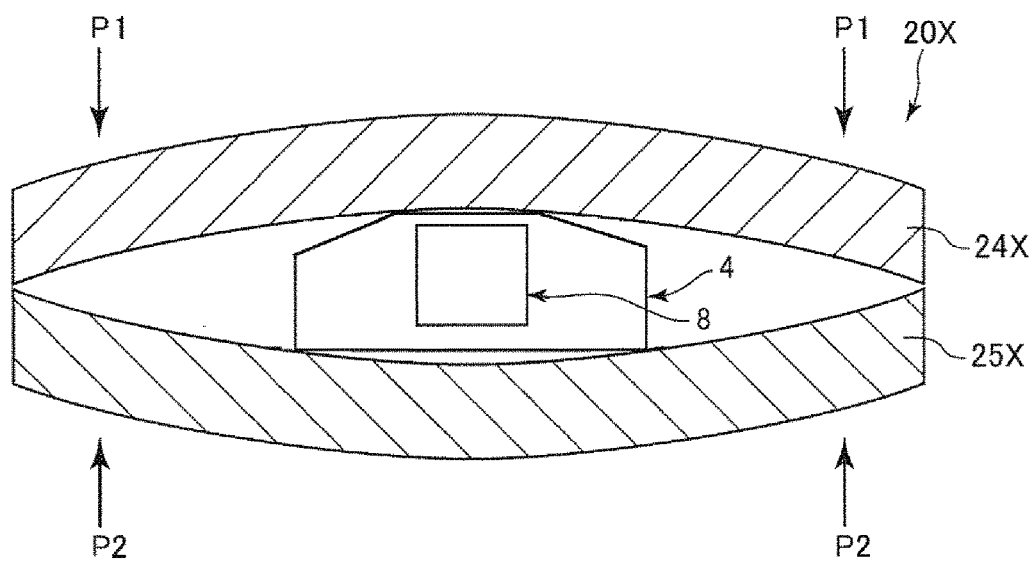
FIG. 9 is a sectional view showing a structure without adjustment parts.
Figure 10:
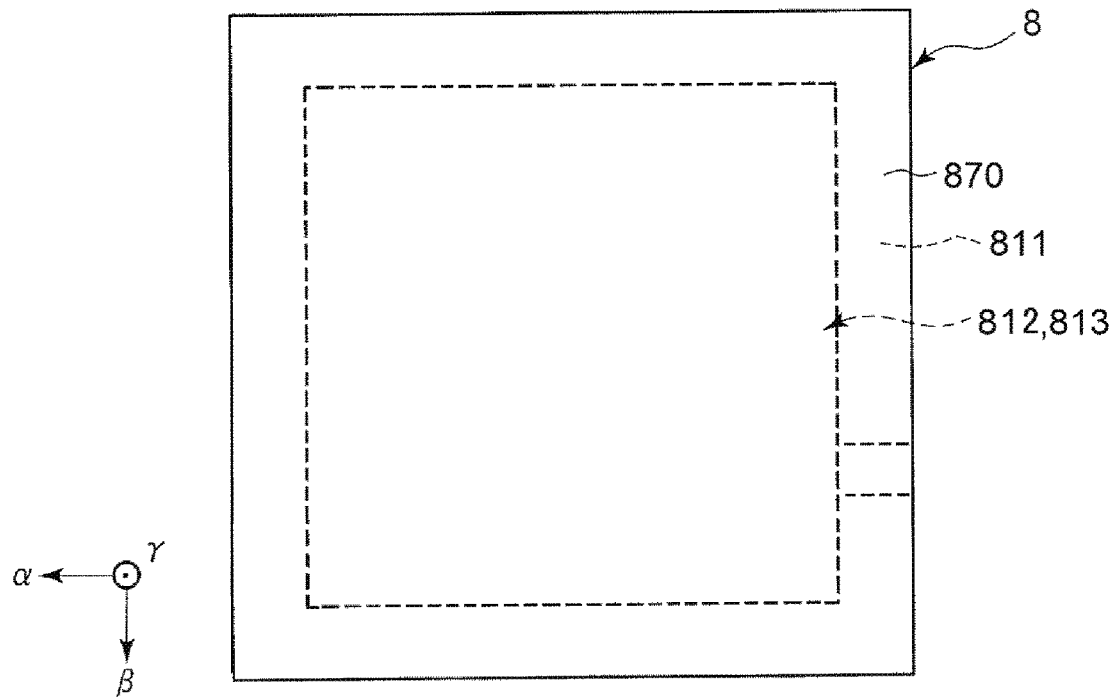
FIG. 10 shows the force detection element shown in FIG. 6 as seen from a direction of an arrow X2.

FIG. 7 is a sectional view schematically showing the structure shown in FIG. 5. FIG. 8 shows the structure shown in FIG. 7 as seen from a direction of an arrow X1. FIG. 9 is a sectional view showing a structure without adjustment parts. FIG. 10 shows a force detection element shown in FIG. 6 as seen from a direction of an arrow X2. Hereinafter, the side in the +γ-axis direction is also referred to as "upper" and the side in the −γ-axis direction is also referred to as "lower".

Structure

As shown in FIGS. 7 and 8, the first fixing portion 24 is a member in a plate shape and has a first part 243 in contact with the sensor device 4 in a plan view as seen from a direction in which the first fixing portion 24 and the second fixing portion 25 overlap (hereinafter, also simply referred to as "plan view"), and a second part 244 located in the outer peripheral portion (periphery) of the first part 243.

The surface of the first part 243 on the sensor device 4 side (a part of the inner wall surface 240) is a flat surface corresponding to the upper part of the sensor device 4 in contact with the sensor device 4.

Through holes 241 through which the above described pressurization bolts 70 are inserted are provided in the second part 244. Further, two concave parts 242 (grooves) are formed in the surface of the second part 244 on the sensor device 4 side.

The concave parts 242 are provided between the through holes 241 and the sensor device 4 in the plan view. The concave parts 242 have longitudinal shapes linearly extending in the β-axis directions. The concave parts 242 are provided, and thereby, a thickness d1 of the parts directly on the concave parts 242 of the first fixing portion 24 is thinner than a thickness d2 in the first part 243. The parts directly on the concave parts 242 form adjustment parts 245 that adjust the contact pressure of the first part 243 on the sensor device 4 to be uniform or nearly uniform. The thickness d1 of the adjustment parts 245 is thinner than the thickness d2 of the first part 243, and thereby, the adjustment parts 245 are more deformable than the first part 243. Accordingly, when forces in the direction of arrows P1 are applied to the first fixing portion 24 by fastening of the pressurization bolts 70, the adjustment parts 245 deform preferentially over the first part 243, and thus, the deformation of the first part 243 may be reduced. Thereby, the contact condition of the first part 243 with the sensor device 4 may be made uniform or nearly uniform.

The second fixing portion 25 has the projecting part 251 projecting toward the first fixing portion 24 side and a thinner part 253 located in the outer peripheral portion of the projecting part 251 in the plan view. The projecting part 251 is in contact with the sensor device 4 as described above. Further, a thickness d3 of the thinner part 253 is thinner than a thickness d4 of the projecting part 251. Accordingly, the thinner part 253 is more deformable than the projecting part 251. Thus, when forces in the direction of arrows P2 are applied to the second fixing portion 25 by fastening of the pressurization bolts 70, the thinner part 253 deforms more largely than the projecting part 251. Particularly, a larger force is applied to a region of the thinner part 253 on the projecting part 251 side due to a difference in rigidity between the thinner part 253 and the projecting part 251. Thereby, the thinner part 253 fulfills the same function as that of the above described adjustment parts 245. Therefore, the contact condition of the projecting part 251 with the sensor device 4 may be made uniform or nearly uniform.

As described above, the force detection apparatus 1 includes the first fixing portion 24 (first member), the second fixing portion 25 (second member) placed to be opposed to the first fixing portion 24, the sensor device 4 placed between the first fixing portion 24 and the second fixing portion 25 and including the force detection element 8 having at least one (six in the embodiment) piezoelectric elements 81, 83, 85 that output signals according to the external force, and the plurality of pressurization bolts 70 (pressurization members) provided in the outer peripheral portion of the sensor device 4 in the plan view as seen from the direction in which the first fixing portion 24 and the second fixing portion 25 overlap and pressurizing the sensor device 4 (see FIGS. 4 and 7). Further, as described above, the first fixing portion 24 has the first part 243 in contact with the sensor device 4 and the second part 244 located in the outer peripheral portion of the first part 243 in the plan view and including the adjustment parts 245 that adjust the contact pressure of the first part 243 on the sensor device 4, and the thickness d1 (the length in the pressurization directions by the pressurization bolts 70) of the adjustment parts 245 is thinner (shorter) than the thickness d2 (the length in the pressurization directions) of the first part 243.

According to the force detection apparatus 1, the adjustment parts 245 are provided, and thereby, the contact pressure (contact condition) of the first part 243 on the sensor device 4 may be made uniform or nearly uniform. Accordingly, higher accuracy of the external force detection by the force detection apparatus 1 may be realized.

Further, as described above, the second fixing portion 25 includes the projecting part 251 in contact with the sensor device 4, and the thinner part 253 located in the outer peripheral portion of the projecting part 251 in the plan view and having the function of adjusting the contact pressure of the projecting part 251 on the sensor device 4. Thereby, in the second fixing portion 25, as is the case of the first fixing portion 24, the contact pressure (contact condition) of the projecting part 251 on the sensor device 4 may be made uniform or nearly uniform. As described above, both the first fixing portion 24 and the second fixing portion 25 have the parts that function as "adjustment parts" (adjustment parts 245, thinner part 253), and thereby, the detection accuracy of the external force may be further increased.

Note that, in the embodiment, the second fixing portion 25 has the projecting part 251 and the thinner part 253, however, for example, the second fixing portion 25 may have the same configuration as the first fixing portion 24. That is, the second fixing portion 25 may have a configuration with a first part in a plate shape and a second part having concave parts (adjustment parts) located in the outer periphery thereof. Or, contrary, the first fixing portion 24 may have the same configuration as the second fixing portion 25.

Here, in a structure 20X shown in FIG. 9, when pressurization is applied to the sensor device 4 using a first fixing portion 24X in a simple plate shape without the adjustment parts 245, parts of the first fixing portion 24X overlapping with the sensor device 4 in the plan view bend, and it may be impossible to bring the first fixing portion 24X into uniform contact with the sensor device 4. Note that the same applies to the case using a second fixing portion 25X in a plate shape.

On the other hand, as described above, the first fixing portion 24 in the embodiment has the adjustment parts 245, thereby, the deformation of the first part 243 may be reduced, and thus, higher accuracy of the external force detection may be realized. Further, in the structure 20X shown in FIG. 9, regarding the forces applied to the first fixing portion 24X when pressurization is applied, the force in the outer peripheral portion of the force detection element 8 is larger than that in the center portion in the plan view. Accordingly, in the structure 20X shown in FIG. 9, breakage of the corner portions of the force detection element 8 housed within the sensor device 4 or the like is highly likely to occur. On the other hand, in the embodiment, the adjustment parts 245 are provided, and the yield strength of the force detection element 8 housed within the sensor device 4 may be improved.

The ratio of the thickness d1 to the thickness d2 (d1/d2) is not particularly limited, but preferably 0.5 d1/d2 0.98 and more preferably 0.7 d1/d2 0.9. Thereby, the function of adjusting the contact pressure of the first part 243 while securing the necessary mechanical strength of the first fixing portion 24 may be fulfilled especially preferably. Note that the thickness d1 is not particularly limited, but may be e.g. from 0.5 cm to 3.0 cm in view of downsizing of the structure 20 and the mechanical strength of the first fixing portion 24. Further, the thickness d2 is not particularly limited, but may be e.g. from 0.25 cm to 2.5 cm. The width of the concave parts 242 is not particularly limited, but preferably set so that the function of adjusting the contact pressure of the first part 243 may be fulfilled with the mechanical strength of the first fixing portion 24 held.

As described above, the adjustment parts 245 are provided between the through holes 241 and the sensor device 4, i.e., between the pressurization bolts 70 (pressurization members) and the sensor device 4 in the plan view (see FIGS. 7 and 8). Thereby, the contact pressure of the first part 243 on the sensor device 4 may be adjusted more preferably.

Further, in the embodiment, the adjustment parts 245 are provided in the center portion between the through holes 241 and the force detection element 8 in the plan view, however, the adjustment parts 245 may be provided closer to the through holes 241 or closer to the sensor device 4 in the plan view.

Furthermore, as described above, the adjustment parts 245 are formed by the parts directly on the concave parts 242. In other words, the concave parts 242 are provided in the second part 244, and the adjustment parts 245 include the bottom portions of the concave parts 242. Thereby, as described above, the contact pressure of the first part 243 on the sensor device 4 may be adjusted more preferably. The concave parts 242 are formed in the first fixing portion 24, and thereby, the adjustment parts 245 may be provided relatively easily.

The second part 244 in the embodiment has the adjustment parts 245 having the thickness d1 and the part having the thickness d2. As described above, the mechanical strength of the second part 244 may be increased by reduction of the parts of the second part 244 than by reduction of the whole of the second part 244, and thus, the sensor device 4 may be supported more reliably.

The concave parts 242 extend in the directions (R-axis directions) orthogonal to both the pressurization directions (γ-axis directions) and the directions parallel to the line segment connecting the through holes 241 (α-axis directions). Thereby, the above described contact pressure of the first part 243 on the sensor device 4 may be easily made uniform or nearly uniform. Note that, for example, the concave parts 242 may be inclined relative to the β-axis directions in the plan view.

In the embodiment, the length of the concave parts 242 in the β-axis directions is formed to be longer than the length of the sensor device 4 in the β-axis directions in the plan view (see FIG. 8). Thereby, the above described contact pressure of the first part 243 on the sensor device 4 may be made more uniform and the contact condition of the first part 243 on the sensor device 4 may be made more uniform.

Further, in the embodiment, the concave parts 242 linearly extend. Thereby, the adjustment parts 245 may be provided in desirable positions relatively easily. Note that the concave parts 242 may have curved shapes in the plan view.

In the embodiment, regarding the configuration of the above described force detection element 8, the efforts are made to realize higher accuracy of the external force detection by the force detection apparatus 1. Specifically, the above described piezoelectric element 81 has the piezoelectric material layer 811 that generates the electric charge $Q\alpha$ by the piezoelectric effect and the output electrode layer 812 (electrode) provided on the piezoelectric material layer 811 and outputting the voltage $V\alpha$ (signal) according to the electric charge $Q\alpha$, and the outer shape of the output electrode layer 812 (electrode) in the plan view is smaller than the outer shape of the piezoelectric material layer 811 in the plan view (see FIGS. 6 and 10). The output electrode layer 812 (except the wire (not shown) for connection to the side electrode 46 shown in FIG. 4) is provided, and thus, reduction of accuracy of the external force detection due to the difference in contact pressure between the center portion and the outer peripheral portion of the force detection element 8 in the plan view may be further reduced. Note that the same applies to the ground electrode layer 813. Further, the same applies to the piezoelectric elements 83, 85.

As described above, the length L1 of the force detection element 8 in the α-axis directions (and the length in the β-axis directions) orthogonal to the γ-axis directions (pressurization directions) is shorter than the length L2 of the force detection element 8 in the γ-axis directions (see FIG. 6). Thereby, the difference in contact pressure between the center portion and the outer peripheral portion of the force detection element 8 in the plan view may be further reduced, and the contact pressure on the sensor device 4 may be made more uniform.

Figure 11:
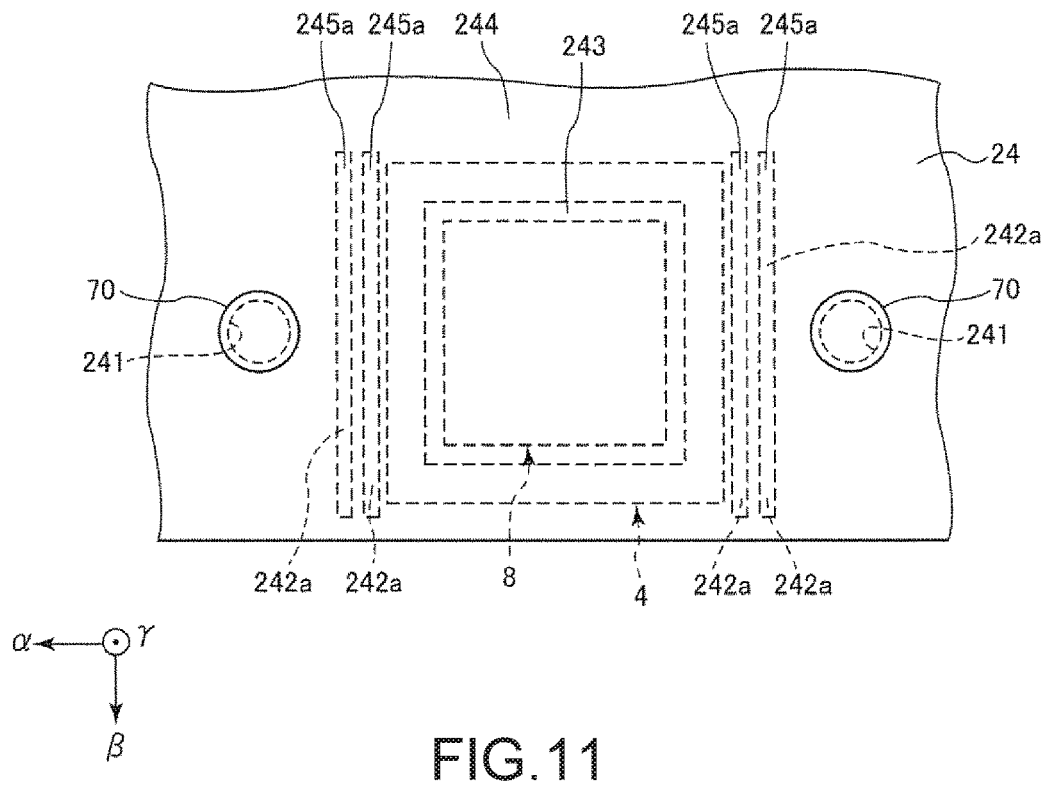
FIG. 11 shows a modified example of the adjustment parts shown in FIG. 8.

FIG. 11 shows a modified example of the adjustment parts shown in FIG. 8.

As shown in FIG. 11, pluralities of adjustment parts 245*a* (concave parts 242*a*) may be provided in a region between the pressurization bolts 70 and the sensor device 4. In FIG. 11, the two adjustment parts 245*a* are provided side by side in the α-axis directions. Thereby, the contact pressure of the first part 243 on the sensor device 4 may be made more uniform and the contact condition of the first part 243 with the sensor device 4 may be made more uniform. Note that the plurality of adjustment parts 245*a* may be provided side by side in the β-axis directions, for example.

Figure 12:
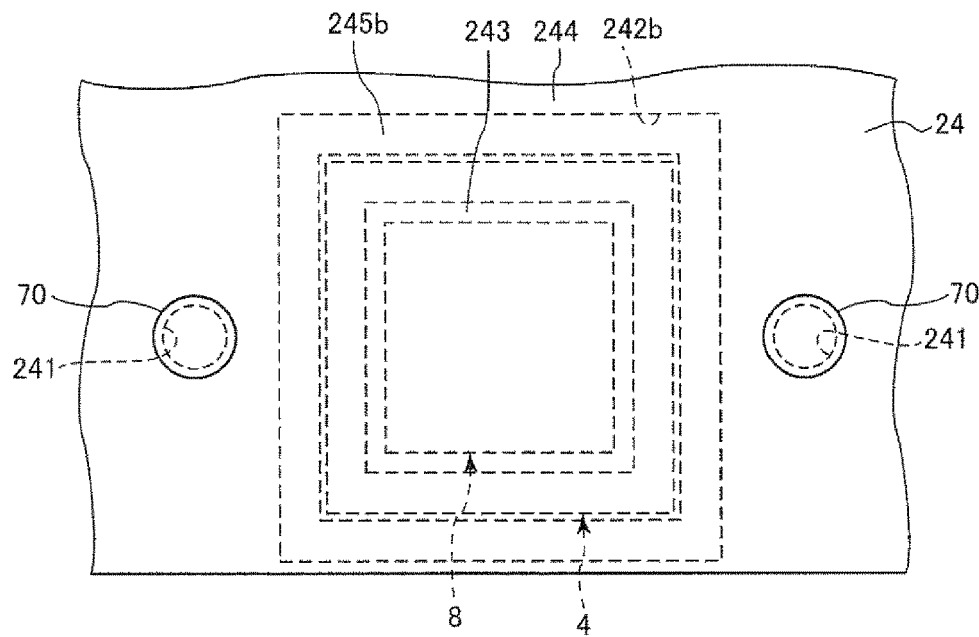
FIG. 12 shows a modified example of adjustment parts shown in FIG. 8.

FIG. 12 shows a modified example of the adjustment parts shown in FIG. 8.

As shown in FIG. 12, an adjustment part 245*b* (concave part 242*b*) may be provided to surround the sensor device 4 in the plan view. In the embodiment, the adjustment part 245*b* (concave part 242*b*) has a rectangular frame shape in the plan view. Thereby, the contact pressure of the first part 243 on the sensor device 4 may be made more uniform and the contact condition of the first part 243 with the sensor device 4 may be made more uniform. Further, when the structure 20 is assembled, the adjustment part 245*b* may be preferably used as a positioning part for determining the position of the sensor device 4 with respect to the adjustment part.

As described above, according to the force detection apparatus 1 of the embodiment, the higher accuracy of the external force detection may be realized and the yield strength of the force detection element 8 may be improved.

Further, in the embodiment, the case where the two pressurization bolts 70 (pressurization members) are provided for each sensor device 4 is explained as an example, however, the number of "pressurization members" may be one, three, or more. Also, in this case, the concave parts 242 (adjustment parts 245) are provided between the pressurization bolts 70 and the sensor device 4 in the plan view, and thereby, the contact pressure of the first part 243 on the sensor device 4 may be made uniform or nearly uniform. Accordingly, the higher accuracy of the external force detection by the force detection apparatus 1 may be realized.

Second Embodiment

Next, the second embodiment will be explained.

Figure 13:
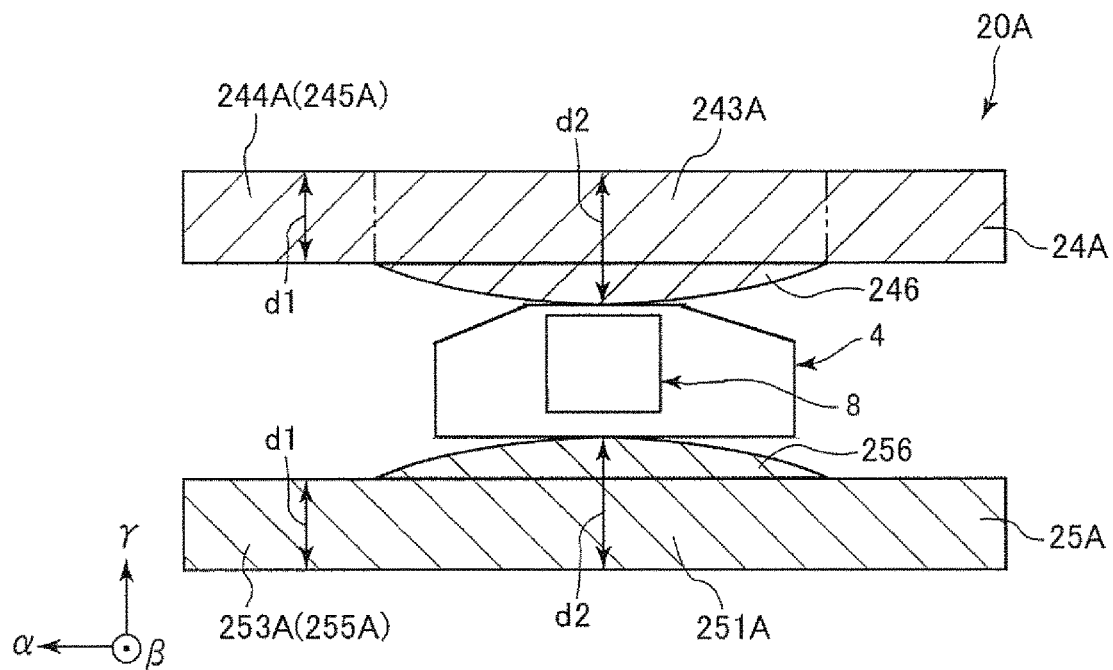
FIG. 13 is a cross sectional view of a structure of a force detection apparatus according to the second embodiment (pressurization is released).
Figure 14:
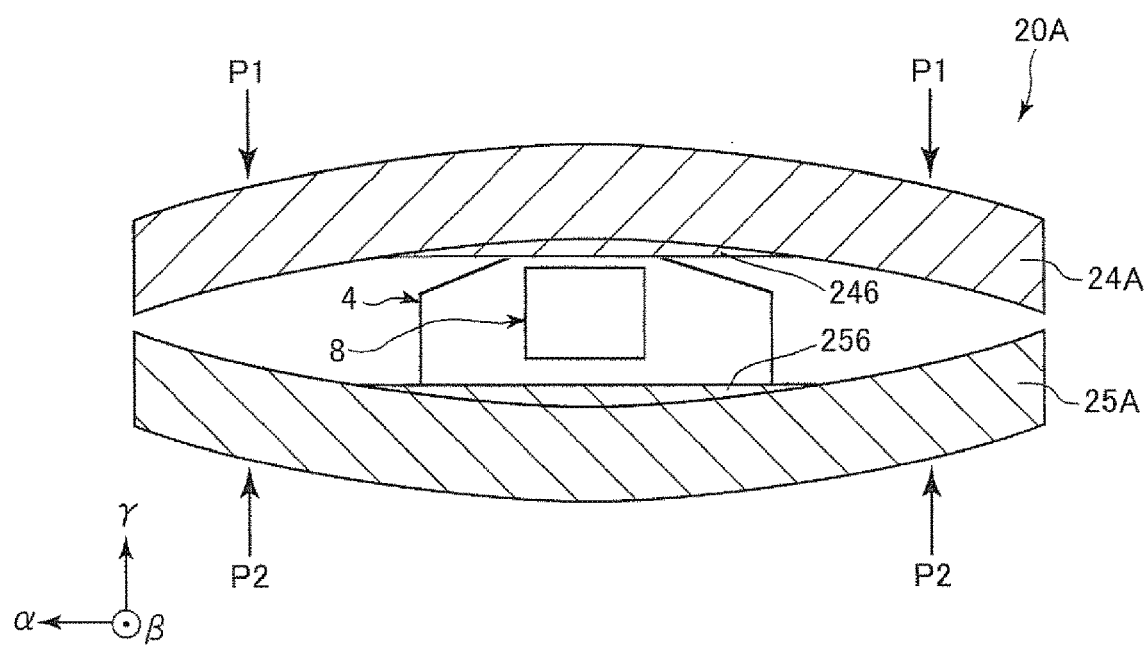
FIG. 14 is a cross sectional view of the structure shown in FIG. 13 (pressurization is applied).

FIG. 13 is a cross sectional view of a structure of a force detection apparatus according to the second embodiment (pressurization is released). FIG. 14 is a cross sectional view of the structure shown in FIG. 13 (pressurization is applied).

The embodiment is the same as the above described embodiment except that the configurations of the first fixing portion 24 and the second fixing portion 25 are different. In the following description, the second embodiment will be explained with a focus on the differences from the above described embodiment and the explanation of the same items will be omitted.

A first part 243A of a first fixing portion 24A of a structure 20A shown in FIG. 13 has a convex part (projection) 246 projecting toward the sensor device 4 side.

As shown in FIG. 13, the convex part 246 has a thickness gradually increasing from the outer periphery toward the center of the sensor device 4 in the plan view in the state in which pressurization is released. In the first fixing portion 24A having the convex part 246, a thickness d1 of a second part 244A is thinner than a thickness d2 of the first part 243A. That is, the second part 244A forms an adjustment part 245A. According to the first fixing portion 24A, as shown in FIG. 14, pressurization is applied, and thereby, the surface of the convex part 246 comes into contact to conform with the flat upper surface of the sensor device 4.

Similarly, the second fixing portion 25A has the same configuration as the first fixing portion 24A. That is, the second fixing portion 25A has a convex part 256 and a thickness d1 of a second part 253A is thinner than a thickness d2 of the first part 251A. Further, the second part 253A forms an adjustment part 255A.

As described above, in the embodiment, the first part 243A has the convex part 246 having a convex shape toward the sensor device 4 when pressurization by the plurality of pressurization bolts 70 (pressurization members) is not applied to the sensor device 4. Thereby, the thickness d1 of the second part 244A is thinner than the thickness d2 of the first part 243A, and thus, the second part 244A (particularly, the portion of the second part 244A closer to the first part 243A) preferentially deforms. In addition, the first part 243A has the convex part 246, and thus, the contact pressure of the first part 243A may be made more uniform or nearly more uniform.

The convex part 246 has the thickness gradually increasing toward the center of the sensor device 4, and thereby, as described above, the surface of the convex part 246 may be brought into contact to conform with the flat upper surface of the sensor device 4 by application of pressurization, and thus, contact pressure of the first part 243A on the sensor device 4 may be made uniform more easily.

Note that the convex part 246 has the gradually increasing thickness, however, "convex part" may have a thickness increasing in a stepwise manner toward the center of the sensor device 4.

According to the above described second embodiment, the same advantages as those of the above described embodiment may be obtained.

Third Embodiment

Next, the third embodiment will be explained.

Figure 15:
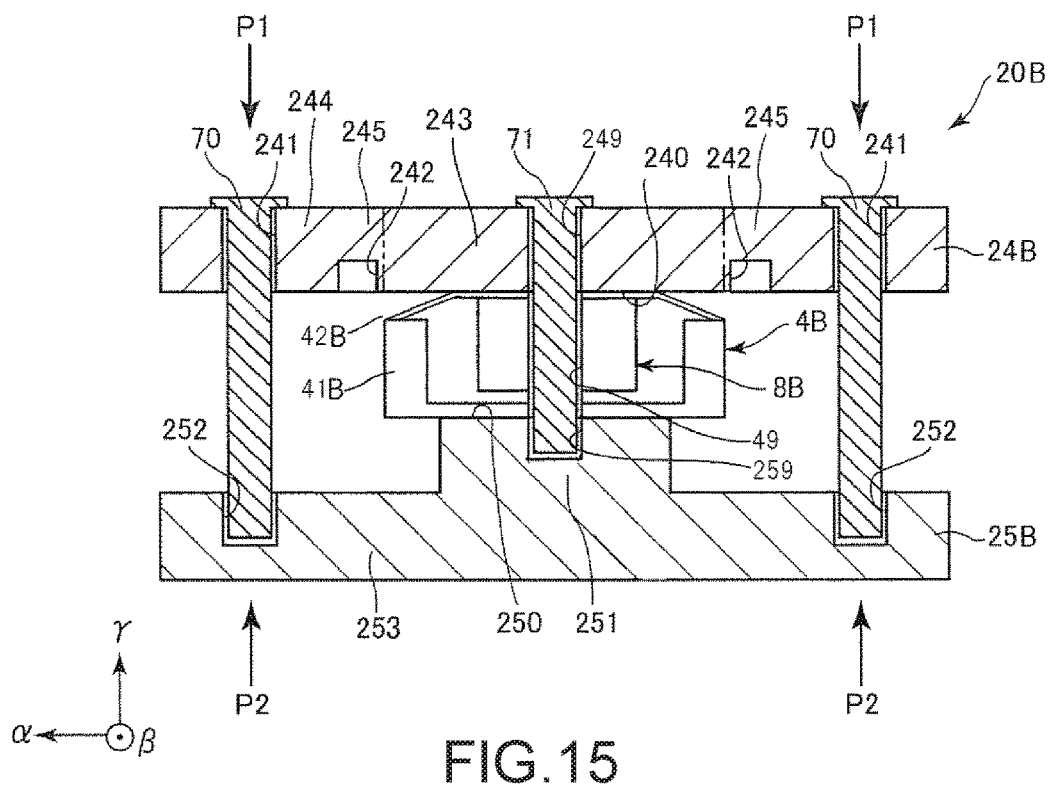
FIG. 15 is a cross sectional view of a structure of a force detection apparatus according to the third embodiment.
Figure 16:
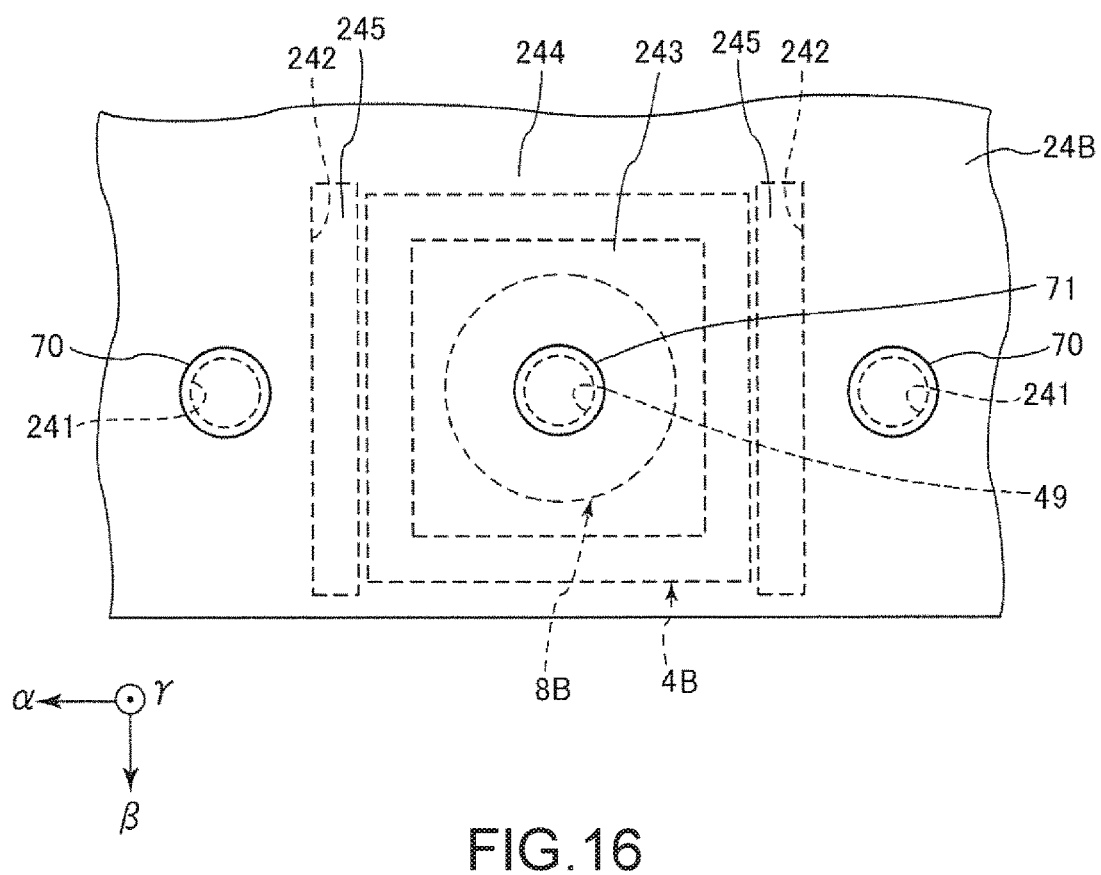
FIG. 16 is a plan view of the structure shown in FIG. 15.
Figure 17:
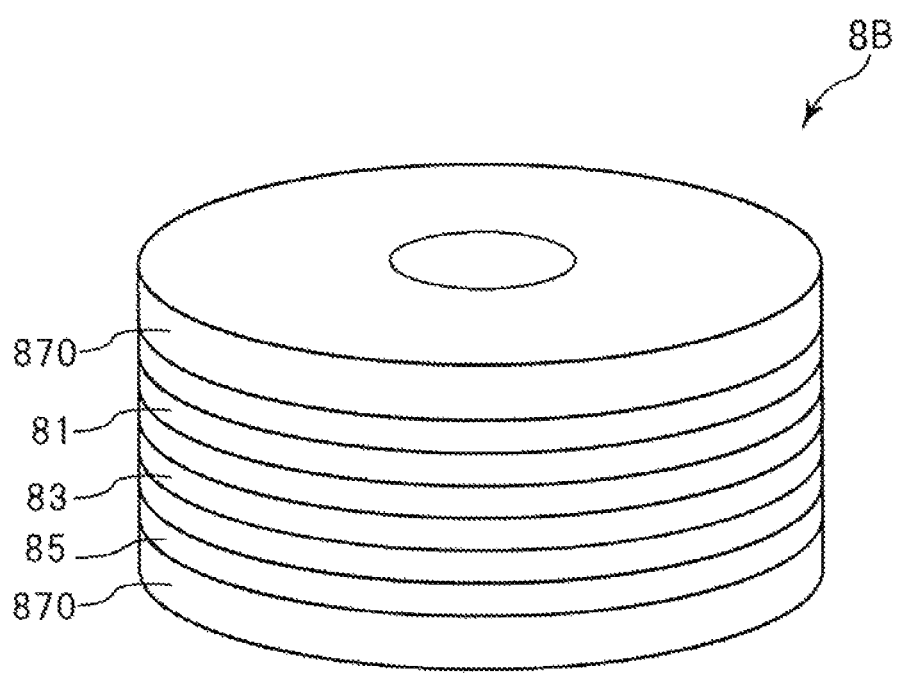
FIG. 17 is a perspective view showing a force detection element shown in FIG. 16.

FIG. 15 is a cross sectional view of a structure of a force detection apparatus according to the third embodiment. FIG. 16 is a plan view of the structure shown in FIG. 15. FIG. 17 is a perspective view showing a force detection element shown in FIG. 16.

The embodiment is the same as the above described embodiments mainly except that the configuration of the structure is different. In the following description, the third embodiment will be explained with a focus on the differences from the above described embodiments and the explanation of the same items will be omitted.

As shown in FIGS. 15 and 16, a structure 20B has a pressurization bolt 71 (center portion pressurization member) provided in the center portion of a sensor device 4B in the plan view.

A through hole 249 through which the pressurization bolt 71 can be inserted is formed in a first fixing portion 24B. Further, a female screw hole 259 that can be screwed together with the tip end portion of the pressurization bolt 71 is formed in a second fixing portion 25B. Further, in the sensor device 4B, a through hole 49 communicating with the through hole 249 and the female screw hole 259, through which the pressurization bolt 71 can be inserted, is provided. Note that, though not specifically shown, a through hole is formed in the center portion of a base part 41B in the plan view and a through hole is formed in the center portion of a lid member 42B in the plan view. A force detection element 8B has a circular cylindrical shape as shown in FIG. 17, through which the pressurization bolt 71 can be inserted. The through hole 49 is formed by the space within the circular cylinder of the force detection element 8B and the respective through holes of the base part 41B and the lid member 42B.

As described above, in the embodiment, the structure 20B includes the pressurization bolt 71 (center portion pressurization member) provided in the center portion of the sensor device 4B (force detection element 8B) in the plan view. Thereby, the contact pressure of the first part 243 of the first fixing portion 24B on the sensor device 4B may be made more uniform.

Further, the force detection element 8B has the circular cylindrical shape. Thereby, stress concentration on the outer peripheral portion of the force detection element 8B may be suppressed. In the point of view, it is preferable that the outer shape of the force detection element 8B in the plan view is a circular shape as in the embodiment. Here, if "force detection element" has e.g. a rectangular cylindrical shape, forces easily concentrate on the outer peripheral portion (corner portions). On the other hand, the outer shape of the force detection element 8B in the plan view is formed in the above described shape, and thereby, stress concentration on the outer peripheral portion of the force detection element 8B may be suppressed. Accordingly, though not shown in the drawing, the contact pressure of the first part 243 on the sensor device 4B may be made more uniform. It is also preferable that the outer shape of the force detection element in the plan view may have a corner portion and the corner portion has at least one shape of an obtuse shape and a rounded shape because the element may offer the same advantages as those described as above.

The through hole is provided in the center portion in the plan view like the force detection element 8B, and thereby, the difference in contact pressure between the center portion and the outer peripheral portion of the force detection element 8B in the plan view may be further reduced, and the contact pressure on the sensor device 4B may be made more uniform.

As above, the force detection apparatus and the robot according to the invention are explained based on the illustrated embodiments, however, the invention is not limited to those. The configurations of the respective parts may be replaced by arbitrary configurations having the same functions. Further, other arbitrary configurations may be added to the invention. Or, the respective embodiments may be appropriately combined.

In the above explanation, the example using the pressurization bolts as the pressurization members and the center portion pressurization member is explained, however, other forms than the pressurization bolts may be used as long as pressurization can be applied.

In the above explanation, the sensor device includes the package, however, does not necessarily include the package as long as the device includes at least one piezoelectric element. For example, the sensor device does not necessarily include the lid member of the package. Or, the sensor device does not necessarily include the sealing member. The base part and the lid member may be directly joined or connected by fitting or the like.

Further, in the above explanation, the first fixing portion (first part) and the second fixing portion (second part) are provided orthogonally to the first plate and the second plate, however, may be parallel or inclined with respect to the plates. Or, the first fixing portion and the second fixing portion may be omitted. That is, the sensor device 4 may be sandwiched by the first plate and the second plate and pressurized. In this case, the first plate may be regarded as the first member and the second plate may be regarded as the second member.

The robot according to the invention is not limited to the six-axis vertical articulated robot. For example, the robot according to the invention may be a horizontal articulated robot or parallel link robot. Further, the robot according to the invention is not limited to the single-arm robot, but may be a dual-arm robot.

The number of arms of the single robot arm of the robot according to the invention may be one to five, seven, or more.

The force detection apparatus according to the invention can be incorporated in other apparatuses than the robots and may be mounted on e.g. vehicles such as automobiles.

The entire disclosure of Japanese Patent Application No. 2017-128483, filed Jun. 30, 2017 is expressly incorporated by reference herein.

What is claimed is:

1. A force detection apparatus comprising:
a first member;
a second member placed to be opposed to the first member;
a sensor device placed between the first member and the second member and including a force detection element having a piezoelectric element that outputs a signal according to an external force; and
a pressurization bolt provided in an outer periphery of the sensor device in a plan view as seen from a direction in which the first member and the second member overlap and pressurizing the sensor device,
wherein the first member has a groove which is between the sensor device and the pressurization bolt in the plan view.

2. The force detection apparatus according to claim 1, wherein the first member has a projection having a convex shape toward the sensor device without pressurization to the sensor device by the pressurization bolt and the projection is contact with the sensor device.

3. The force detection apparatus according to claim 2, wherein the projection has a thickness gradually increasing toward a center of the sensor device.

4. The force detection apparatus according to claim 1, wherein a length of the force detection element in directions orthogonal to the pressurization directions is shorter than a length of the force detection element in the pressurization directions.

5. The force detection apparatus according to claim 1, wherein the piezoelectric element has a piezoelectric material layer that generates electric charge by a piezoelectric effect and an electrode provided in the piezoelectric material layer and outputting a signal according to the electric charge, and an outer shape of the electrode in the plan view is smaller than an outer shape of the piezoelectric material layer in the plan view.

6. The force detection apparatus according to claim 1, further comprising a pressurization bolt provided in a center of the sensor device in the plan view.

7. The force detection apparatus according to claim 1, wherein an outer shape of the force detection element in the plan view is a circular shape.

8. The force detection apparatus according to claim 1, wherein an outer shape of the force detection element in the plan view has a corner and the corner portion is at least one of an obtuse shape and a rounded shape.

9. A robot comprising:
a base;
an arm connected to the base; and
a force detection apparatus connected to the arm,
wherein the force detection apparatus includes:
a first member;
a second member placed to be opposed to the first member;
a sensor device placed between the first member and the second member and including a force detection element having a piezoelectric element that outputs a signal according to an external force; and
a pressurization bolt provided in an outer periphery of the sensor device in a plan view as seen from a direction in which the first member and the second member overlap and pressurizing the sensor device, and the first member has a groove which is between the sensor device and the pressurization bolt in the plan view.

10. The robot according to claim 9, wherein the first member has a projection having a convex shape toward the sensor device without pressurization to the sensor device by the pressurization bolt and the projection is contact with the sensor device.

11. The robot according to claim 10, wherein the projection has a thickness gradually increasing toward a center of the sensor device.

12. The robot according to claim 9, wherein a length of the force detection element in directions orthogonal to the pressurization directions is shorter than a length of the force detection element in the pressurization directions.

13. The robot according to claim 9, wherein the piezoelectric element has a piezoelectric material layer that generates electric charge by a piezoelectric effect and an electrode provided in the piezoelectric material layer and outputting a signal according to the electric charge, and an outer shape of the electrode in the plan view is smaller than an outer shape of the piezoelectric material layer in the plan view.

14. The robot according to claim 9, wherein the force detection apparatus includes a pressurization bolt provided in a center of the sensor device in the plan view.

15. The robot according to claim 9, wherein an outer shape of the force detection element in the plan view is a circular shape.

16. The robot according to claim 9, wherein an outer shape of the force detection element in the plan view has a corner and the corner portion is at least one of an obtuse shape and a rounded shape.

* * * * *